(12) United States Patent
Fukunaga et al.

(10) Patent No.: US 10,147,977 B2
(45) Date of Patent: Dec. 4, 2018

(54) NON-AQUEOUS ELECTROLYTE SECONDARY BATTERY AND METHOD FOR PRODUCING NON-AQUEOUS ELECTROLYTE SECONDARY BATTERY

(71) Applicant: ELIIY Power Co., Ltd., Tokyo (JP)

(72) Inventors: Takao Fukunaga, Tokyo (JP);
Tomitaro Hara, Tokyo (JP); Yusuke Kazushima, Tokyo (JP)

(73) Assignee: ELIIY POWER CO., LTD., Tokyo (JP)

( * ) Notice: Subject to any disclaimer, the term of this patent is extended or adjusted under 35 U.S.C. 154(b) by 206 days.

(21) Appl. No.: 14/652,041

(22) PCT Filed: Dec. 13, 2012

(86) PCT No.: PCT/JP2012/082401
§ 371 (c)(1),
(2) Date: Jun. 12, 2015

(87) PCT Pub. No.: WO2014/091606
PCT Pub. Date: Jun. 19, 2014

(65) Prior Publication Data
US 2015/0318580 A1    Nov. 5, 2015

(51) Int. Cl.
*H01M 2/26*      (2006.01)
*H01M 10/056*      (2010.01)
(Continued)

(52) U.S. Cl.
CPC ....... *H01M 10/4235* (2013.01); *H01M 2/263* (2013.01); *H01M 4/133* (2013.01);
(Continued)

(58) Field of Classification Search
None
See application file for complete search history.

(56) References Cited

U.S. PATENT DOCUMENTS

2001/0041288 A1* 11/2001 Onishi .................. H01M 2/266
429/161
2003/0129498 A1   7/2003 Tsukamoto
(Continued)

FOREIGN PATENT DOCUMENTS

| CN | 102420340 A | 4/2012 |
|---|---|---|
| EP | 2330675 A1 | 6/2011 |

(Continued)

OTHER PUBLICATIONS

Machine translation of JP 2000-311717, Nov. 2000.*
(Continued)

*Primary Examiner* — Jonathan Crepeau
(74) *Attorney, Agent, or Firm* — Stites & Harbison, PLLC; Jeffrey A. Haeberlin

(57) ABSTRACT

The present invention provides a non-aqueous electrolyte secondary battery that can suppress a drop in a flash point of an electrolyte solution even if the non-aqueous electrolyte secondary battery is used for a long time. The non-aqueous electrolyte secondary battery includes: an electrode body having a structure in which a positive electrode including a positive-electrode active material and a negative electrode including a negative-electrode active material are stacked with a separator interposed therebetween; a non-aqueous electrolyte solution containing a flame retardant; and an outer casing accommodating the electrode body and the non-aqueous electrolyte solution. The non-aqueous electrolyte solution in the electrode body has a flame retardant concentration lower than a flame retardant concentration in the non-aqueous electrolyte solution between the electrode body and the outer casing.

13 Claims, 9 Drawing Sheets

(51) Int. Cl.
  *H01M 10/058*      (2010.01)
  *H01M 10/42*       (2006.01)
  *H01M 10/44*       (2006.01)
  *H01M 4/133*       (2010.01)
  *H01M 10/0567*     (2010.01)
  *H01M 10/0525*     (2010.01)

(52) U.S. Cl.
  CPC ..... *H01M 10/058* (2013.01); *H01M 10/0525* (2013.01); *H01M 10/0567* (2013.01); *H01M 10/44* (2013.01); *H01M 2300/004* (2013.01); *H01M 2300/0025* (2013.01); *Y10T 29/49117* (2015.01)

(56) References Cited

U.S. PATENT DOCUMENTS

| | | |
|---|---|---|
| 2011/0159379 A1 | 6/2011 | Matsumoto et al. |
| 2012/0219865 A1 | 8/2012 | Kaneko et al. |

FOREIGN PATENT DOCUMENTS

| | | |
|---|---|---|
| JP | H06-013108 A | 1/1994 |
| JP | H08-148162 A | 6/1996 |
| JP | H11-317232 A | 11/1999 |
| JP | 2000-311717 A | 11/2000 |
| JP | 2001-076759 A | 3/2001 |
| JP | 2003-007332 A | 1/2003 |
| JP | 2006-294282 A | 10/2006 |
| JP | 2007-207455 A | 8/2007 |
| JP | 2012-109219 A | 6/2012 |
| WO | 2009028567 A1 | 3/2009 |
| WO | 2010/030008 A1 | 3/2010 |
| WO | 2011/052428 A1 | 5/2011 |

OTHER PUBLICATIONS

ISA/JPO, International Search Report in corresponding international application PCT/JP2012/082401, dated Mar. 19, 2013.
European Patent Office, Extended European Search Report issued in corresponding Application No. EP 12890013, dated Nov. 22, 2016.

* cited by examiner

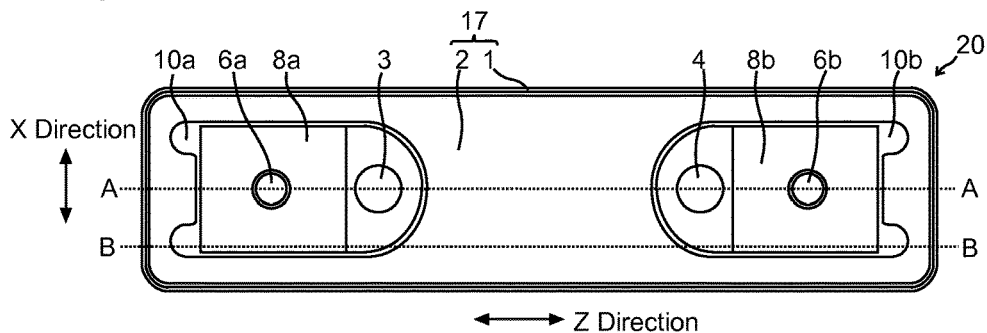
[Fig. 1]
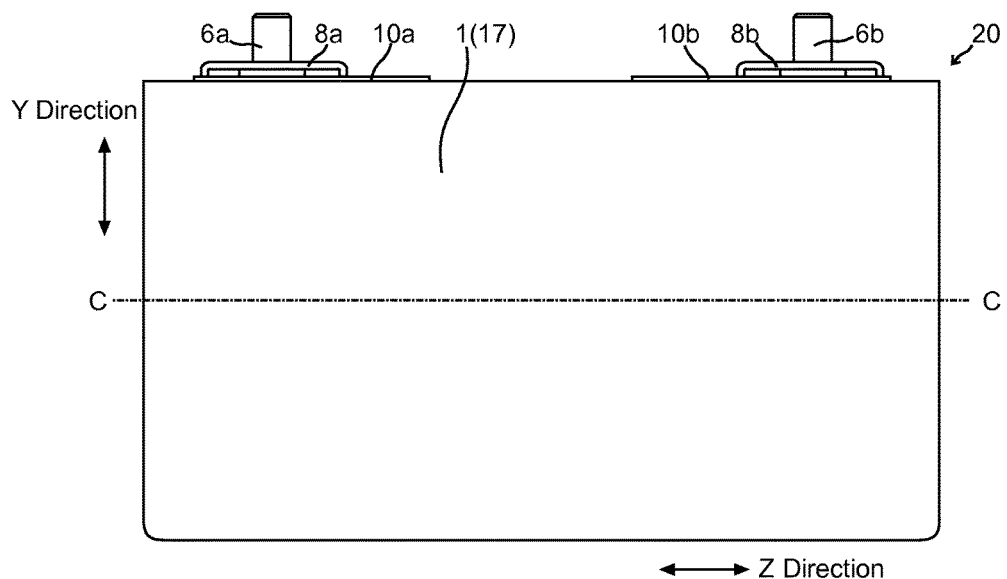
[Fig. 2]
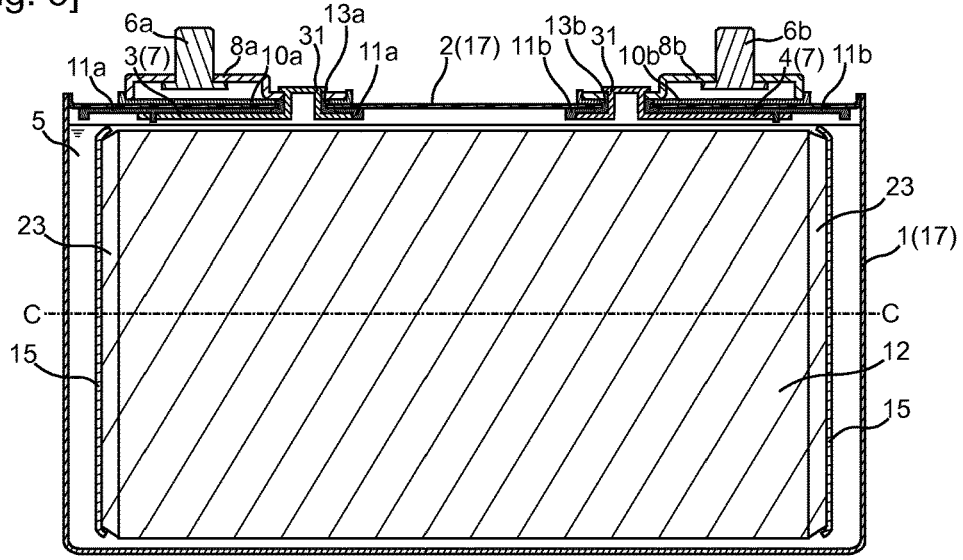
[Fig. 3]

[Fig. 4]
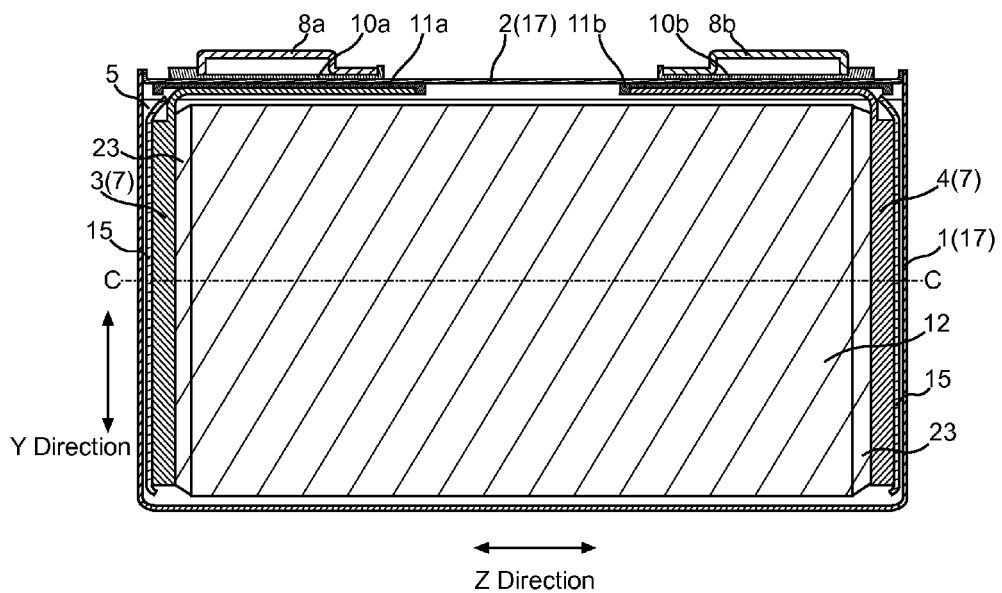
[Fig. 5]
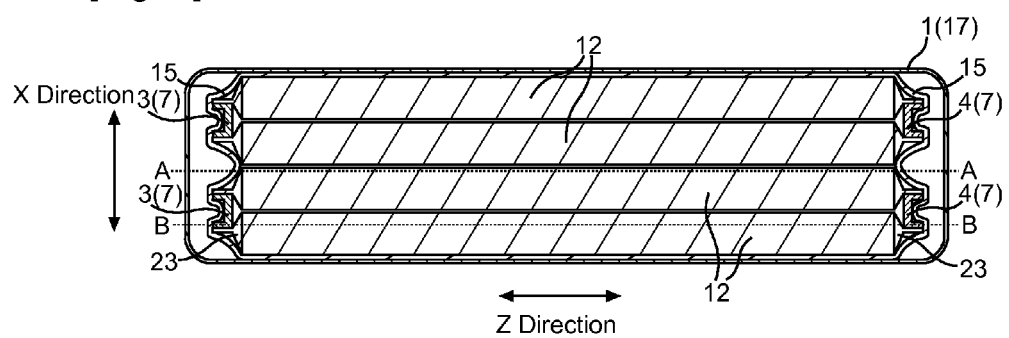

[Fig. 6]
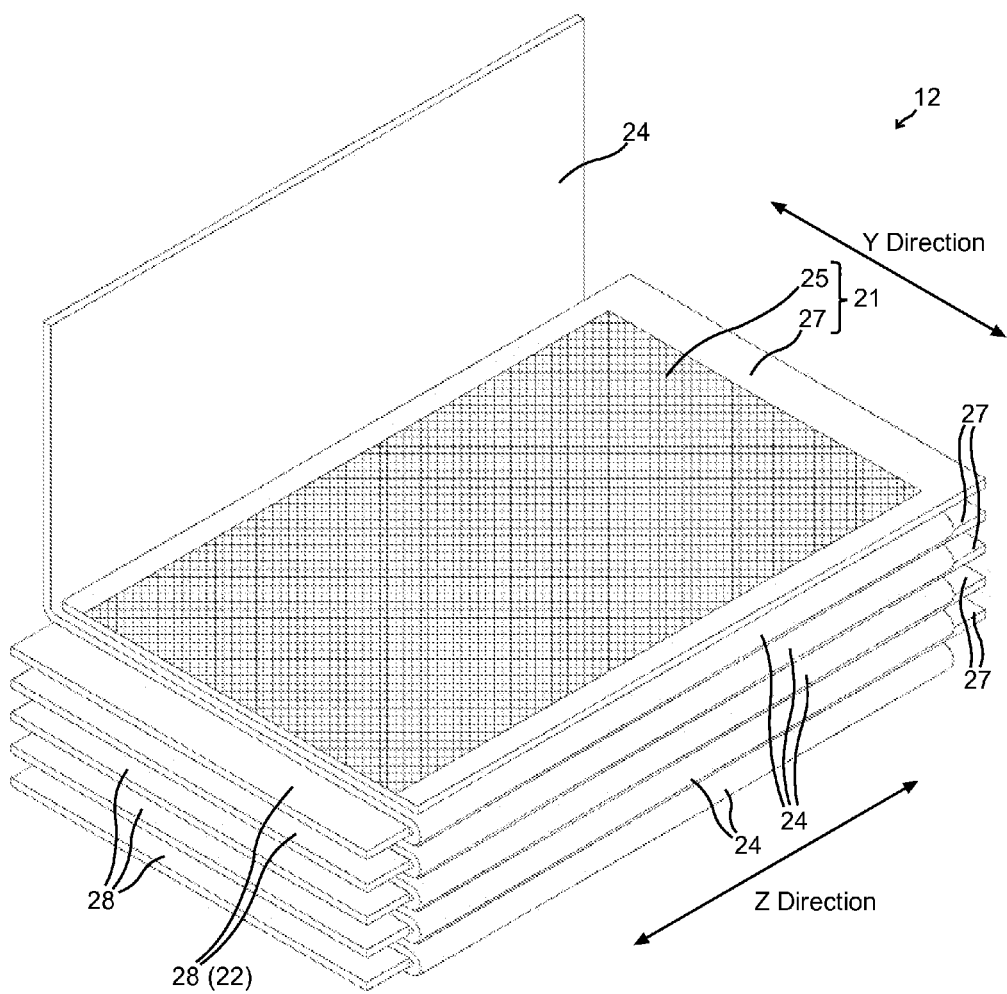

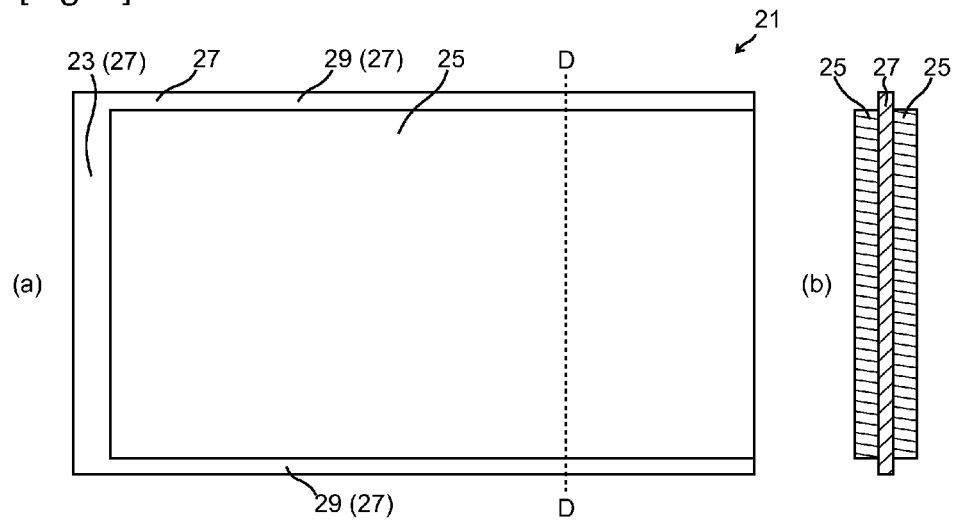
[Fig. 7]
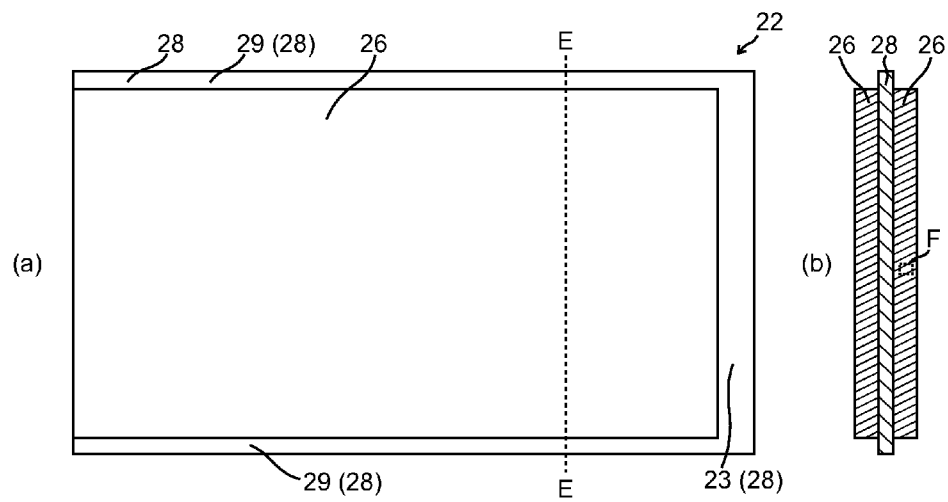
[Fig. 8]

[Fig. 9]
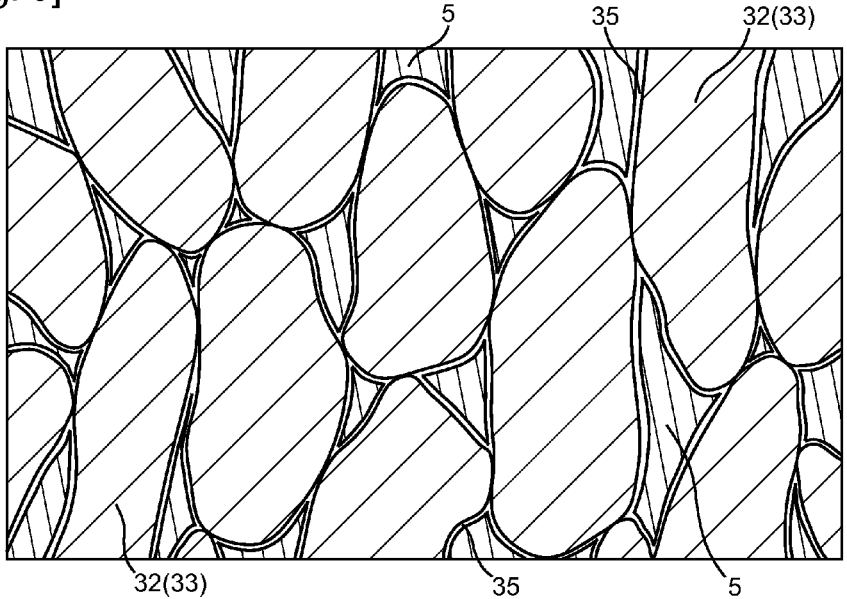
[Fig. 10]
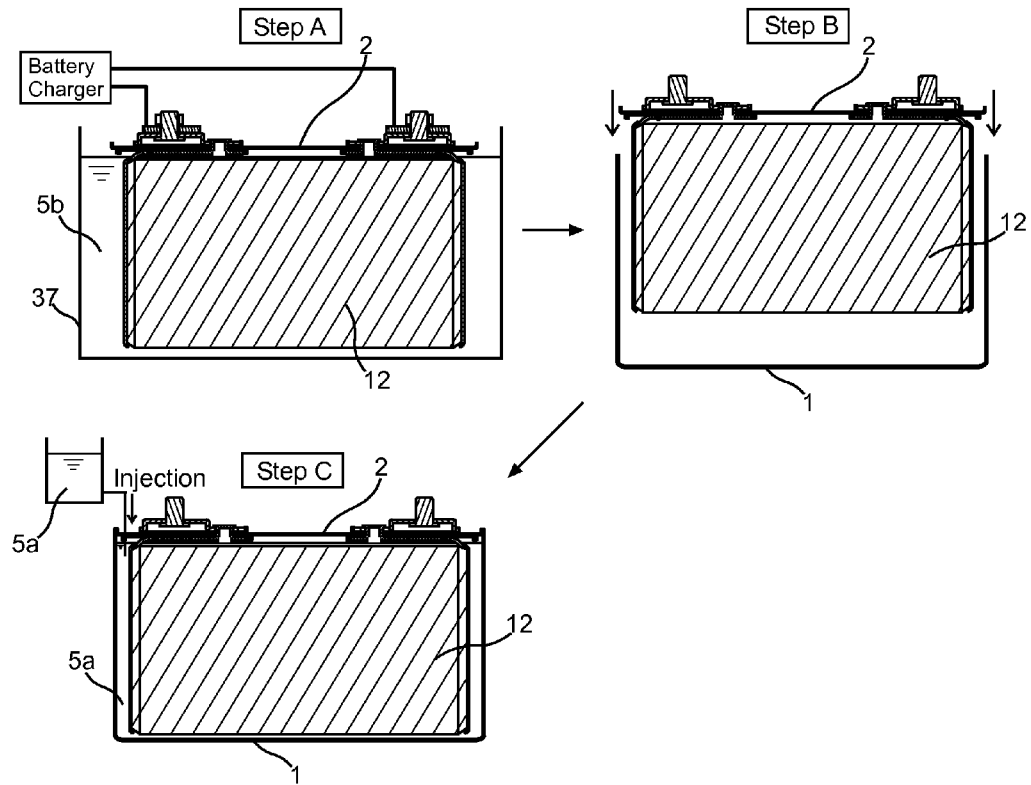

[Fig. 11]
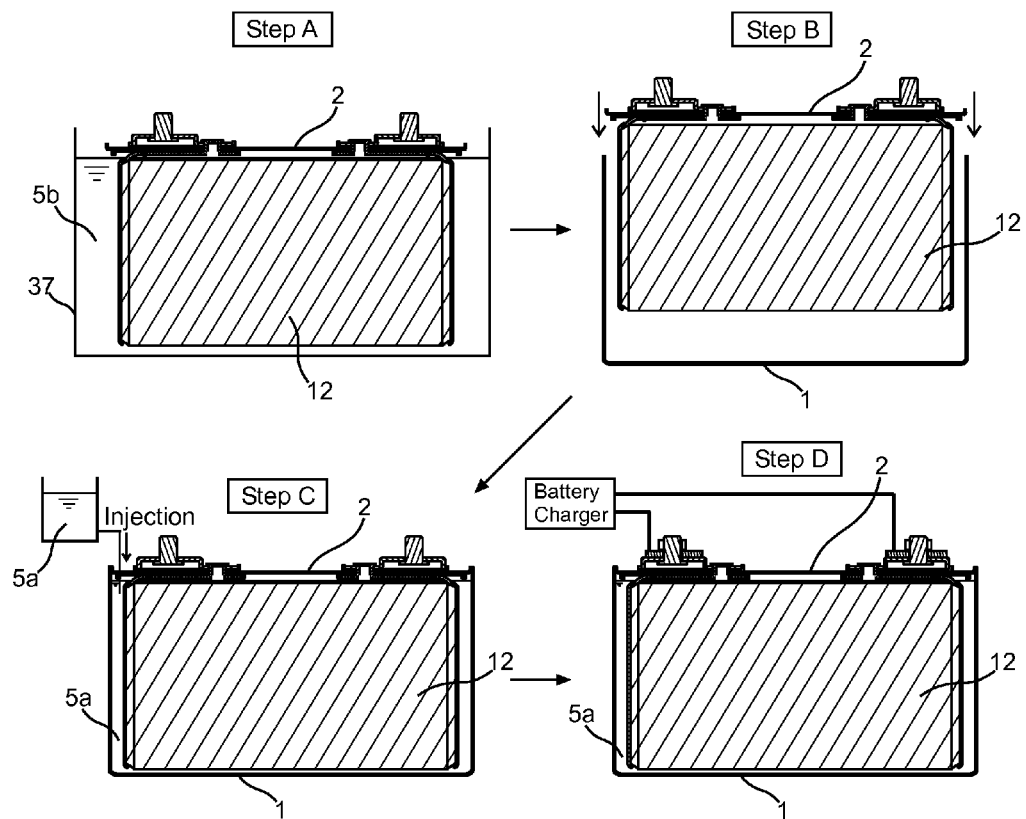

[Fig. 12]
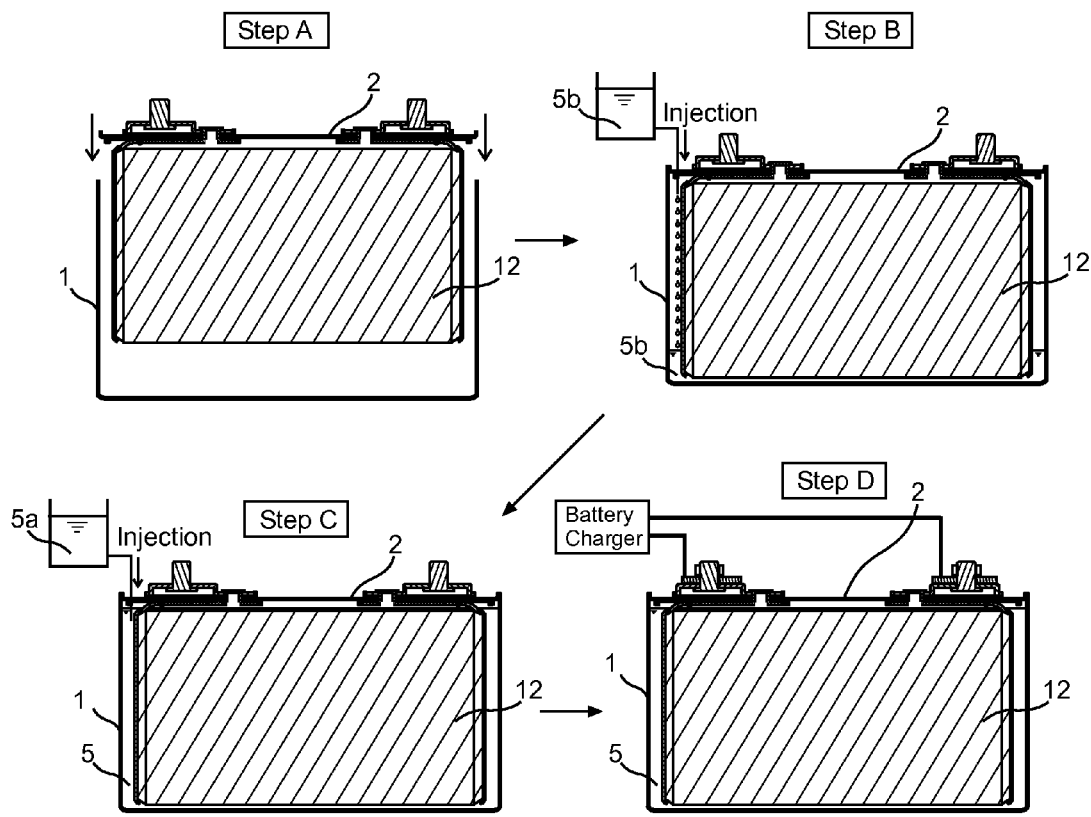

[Fig. 13]
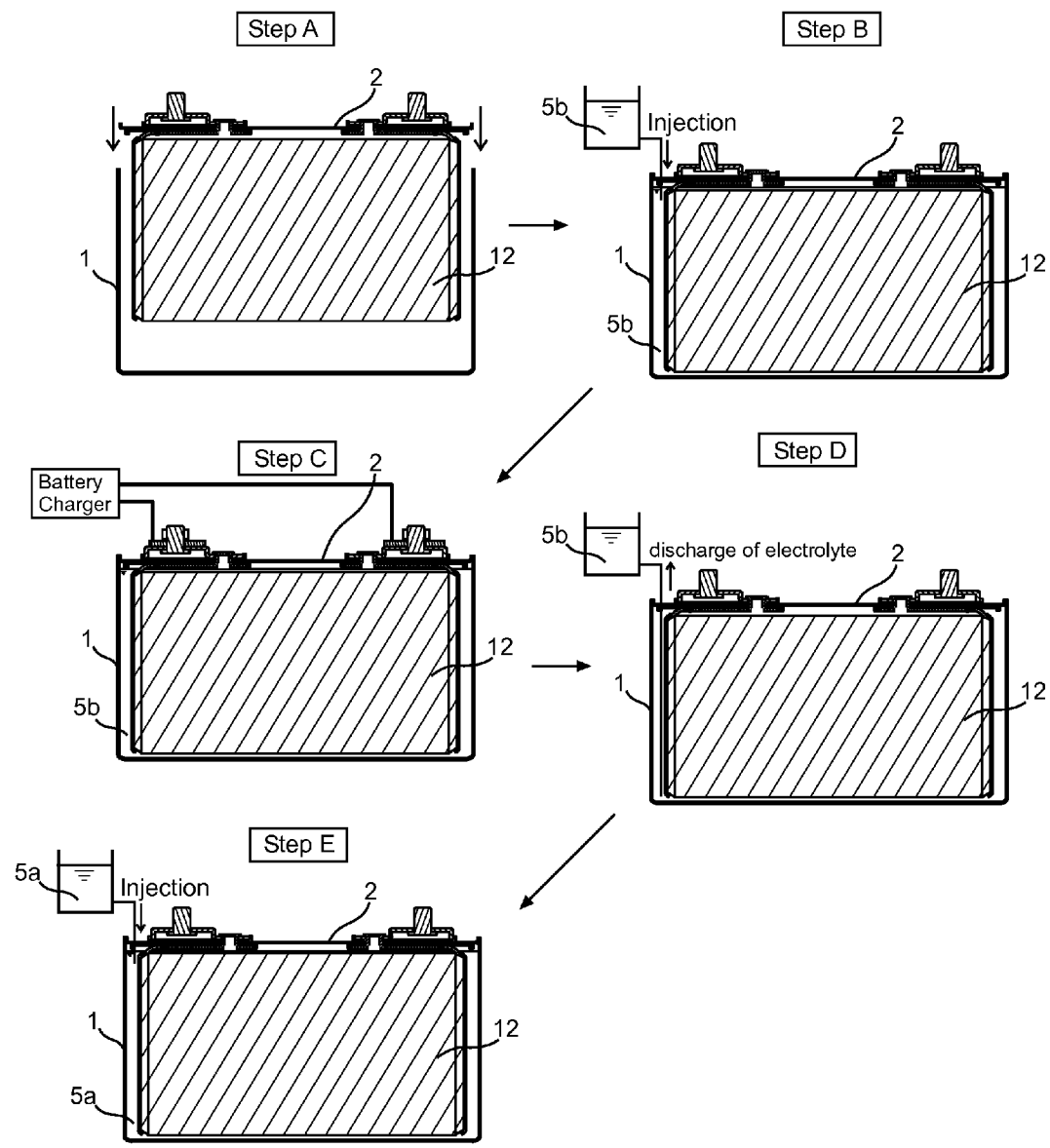

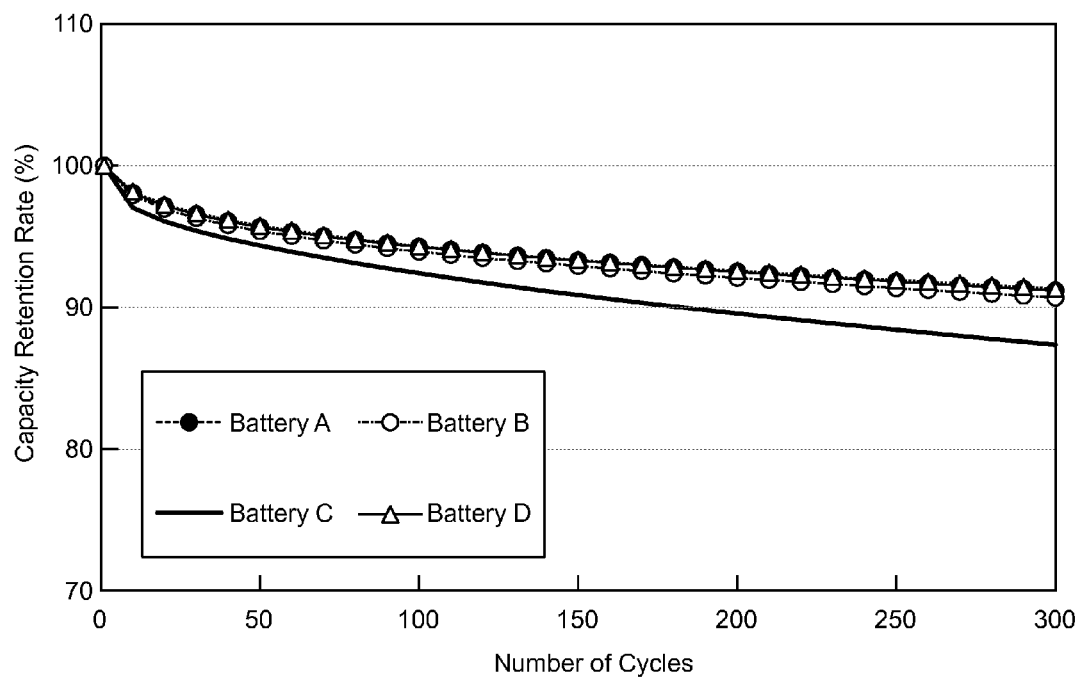
[Fig. 14]

NON-AQUEOUS ELECTROLYTE SECONDARY BATTERY AND METHOD FOR PRODUCING NON-AQUEOUS ELECTROLYTE SECONDARY BATTERY

TECHNICAL FIELD

The present invention relates to a non-aqueous electrolyte secondary battery and a method for producing a non-aqueous electrolyte secondary battery.

BACKGROUND ART

Lithium ion secondary batteries have attracted attention because of their high energy density and have been actively researched and developed.

A conventional lithium ion secondary battery often uses a solution prepared by dissolving a lithium salt such as $LiPF_6$ into a mixture solvent of cyclic carbonate such as ethylene carbonate (EC) or propylene carbonate (PC) and chain carbonate such as diethyl carbonate (DEC) or dimethyl carbonate (DMC) as an electrolyte solution. The non-aqueous electrolyte solution prepared by using these carbonates has a low flash point of about 30° C. Therefore, when an electrolyte solution leaks out by some accident in the presence of a fire source, there is a danger of a fire caused by the leaking electrolyte solution which catches fires. In view of this, various techniques of raising a flashpoint of an electrolyte solution have been studied. For example, mixing a flame retardant into an electrolyte solution has been studied as one of techniques of raising a flashpoint of an electrolyte solution (see Patent Document 1, for example).

CITATION LIST

Patent Document

Patent Document 1: Japanese Unexamined Patent Publication No. H11-317232
Patent Document 2: Japanese Unexamined Patent Publication No. H06-13108

DISCLOSURE OF THE INVENTION

Problem to be Solved by the Invention

In a conventional non-aqueous electrolyte secondary battery using an electrolyte solution containing a flame retardant, a flash point of the electrolyte solution rises to enhance safety to fires. However, when the non-aqueous electrolyte secondary battery is used for a long time, the flash point of the electrolyte solution might be lowered. In addition, the conventional non-aqueous electrolyte secondary battery using an electrolyte solution containing a flame retardant mixed therein has a problem such that various characteristics of the battery, especially life characteristics such as cycle characteristics and floating charge characteristics, are more significantly deteriorated than a battery not containing a flame retardant.

In view of the above-described circumstances, the present invention has been accomplished to provide a non-aqueous electrolyte secondary battery that can suppress a drop in a flash point of an electrolyte solution even if the non-aqueous electrolyte secondary battery is used for a long time.

Means for Solving the Problems

The present invention provides a non-aqueous electrolyte secondary battery comprising: an electrode body having a structure in which a positive electrode including a positive-electrode active material and a negative electrode including a negative-electrode active material are stacked with a separator interposed therebetween; a non-aqueous electrolyte solution containing a flame retardant; and an outer casing accommodating the electrode body and the non-aqueous electrolyte solution, wherein the non-aqueous electrolyte solution in the electrode body has a flame retardant concentration lower than a flame retardant concentration in a non-aqueous electrolyte solution between the electrode body and the outer casing.

Effect of the Invention

According to the present invention, a non-aqueous electrolyte secondary battery comprises: an electrode body having a structure in which a positive electrode including a positive-electrode active material and a negative electrode including a negative-electrode active material are stacked with a separator interposed therebetween; a non-aqueous electrolyte solution containing a flame retardant; and an outer casing accommodating the electrode body and the non-aqueous electrolyte solution. Therefore, charges can be moved between the positive-electrode active material and the negative-electrode active material through the non-aqueous electrolyte solution, whereby the battery can be charged and discharged.

The non-aqueous electrolyte secondary battery according to the present invention comprises a non-aqueous electrolyte solution containing a frame retardant. Therefore, a flash point of the non-aqueous electrolyte solution can be raised, whereby safety of the battery can be enhanced.

In the present invention, the non-aqueous electrolyte solution in the electrode body has a flame retardant concentration lower than a flame retardant concentration in a non-aqueous electrolyte solution between the electrode body and the outer casing. This configuration can suppress the consumption of the flame retardant caused by an electrochemical reaction in the positive-electrode active material and the negative-electrode active material due to charging and discharging of the battery. This can suppress a reduction in the flame retardant concentration in the non-aqueous electrolyte solution, even when the battery is repeatedly charged and discharged. Consequently, a drop in the flash point of the non-aqueous electrolyte solution can be suppressed, even if the non-aqueous electrolyte secondary battery is used for a long time. Accordingly, safety of the non-aqueous electrolyte secondary battery can be enhanced.

It has been found from the experiment conducted by the present inventor that a flash point of a non-aqueous electrolyte solution is lowered due to repeated charging and discharging in a conventional non-aqueous electrolyte secondary battery using a non-aqueous electrolyte solution containing a frame retardant. It has also been found from the experiment conducted by the present inventor that a drop in a flash point of a non-aqueous electrolyte solution can be suppressed even with repeated charging and discharging in a non-aqueous electrolyte secondary battery according to an example of the present invention.

According to the present invention, the non-aqueous electrolyte solution in the electrode body has a flame retardant concentration lower than a flame retardant concentration in a non-aqueous electrolyte solution between the electrode body and the outer casing. This configuration can reduce an amount of the flame retardant to be inserted into a solid electrolyte interface film formed on the surface of the positive-electrode active material or the surface of the negative-electrode active material upon charging of the non-aqueous electrolyte secondary battery. With this, a reduction in battery capacity can be suppressed even with the repeated charging-discharging cycles of the non-aqueous electrolyte secondary battery, whereby battery life characteristics can be enhanced. This effect has been demonstrated by the experiment conducted by the present inventor.

BRIEF DESCRIPTION OF THE DRAWINGS

FIG. 1 is a schematic top view illustrating a non-aqueous electrolyte secondary battery according to one embodiment of the present invention.

FIG. 2 is a schematic side view illustrating the non-aqueous electrolyte secondary battery according to one embodiment of the present invention.

FIG. 3 is a schematic sectional view illustrating the non-aqueous electrolyte secondary battery taken along a dotted line A-A in FIG. 1.

FIG. 4 is a schematic sectional view illustrating the non-aqueous electrolyte secondary battery taken along a dotted line B-B in FIG. 1.

FIG. 5 is a schematic sectional view illustrating the non-aqueous electrolyte secondary battery taken along a dashed-dotted line C-C in FIG. 2.

FIG. 6 is an explanatory view illustrating an electrode body included in the non-aqueous electrolyte secondary battery according to one embodiment of the present invention.

FIG. 7(a) is a schematic plan view illustrating a positive electrode included in the non-aqueous electrolyte secondary battery according to one embodiment of the present invention, and FIG. 7(b) is a schematic sectional view illustrating the positive electrode taken along a dotted line D-D in FIG. 7(a).

FIG. 8(a) is a schematic plan view illustrating a negative electrode included in the non-aqueous electrolyte secondary battery according to one embodiment of the present invention, and FIG. 8(b) is a schematic sectional view illustrating the negative electrode taken along a dotted line E-E in FIG. 8(a).

FIG. 9 is a schematic sectional view illustrating a negative-electrode active material layer in a range F enclosed by a dotted line in FIG. 8.

FIG. 10 is a process diagram illustrating a method for producing the non-aqueous electrolyte secondary battery according to one embodiment of the present invention.

FIG. 11 is a process diagram illustrating a method for producing the non-aqueous electrolyte secondary battery according to one embodiment of the present invention.

FIG. 12 is a process diagram illustrating a method for producing the non-aqueous electrolyte secondary battery according to one embodiment of the present invention.

FIG. 13 is a process diagram illustrating a method for producing the non-aqueous electrolyte secondary battery according to one embodiment of the present invention.

FIG. 14 is a graph illustrating a measurement result of a charging-discharging cycle test.

MODE FOR CARRYING OUT THE INVENTION

A non-aqueous electrolyte secondary battery according to the present invention comprises: an electrode body having a structure in which a positive electrode including a positive-electrode active material and a negative electrode including a negative-electrode active material are stacked with a separator interposed therebetween; a non-aqueous electrolyte solution containing a flame retardant; and an outer casing accommodating the electrode body and the non-aqueous electrolyte solution, wherein the non-aqueous electrolyte solution in the electrode body has a flame retardant concentration lower than a flame retardant concentration in a non-aqueous electrolyte solution between the electrode body and the outer casing.

The non-aqueous electrolyte solution in the electrode body means here a non-aqueous electrolyte solution retained in the electrode body, i.e., a non-aqueous electrolyte solution in pores of electrode active material layers, a non-aqueous electrolyte solution in pores of a separator, a non-aqueous electrolyte solution in a gap between an electrode and a separator, and a non-aqueous electrolyte solution inside a fixing member such as a shrink tube holding electrodes together.

The non-aqueous electrolyte solution between the electrode body and the outer casing means an electrolyte solution present between an electrode body and an outer casing. When a fixing member for fixing an electrode body, such as a shrink tube, is provided, a non-aqueous electrolyte solution between the electrode body and the outer casing means an electrolyte solution between the fixing member and the outer casing.

Preferably, in the non-aqueous electrolyte secondary battery according to the present invention, the negative electrode includes a porous negative-electrode active material layer including the negative-electrode active material, and the non-aqueous electrolyte solution in the electrode body is a non-aqueous electrolyte solution in pores of the negative-electrode active material layer.

This configuration can suppress a consumption of a flame retardant by an electrochemical reaction in the negative-electrode active material caused by charging and discharging of the battery.

Preferably, in the non-aqueous electrolyte secondary battery according to the present invention, the non-aqueous electrolyte solution contains ethylene carbonate.

With this configuration an SEI (Solid Electrolyte Interface) serving as a solid electrolyte interface film can be formed on the surface of the negative-electrode active material with charging.

Preferably, in the non-aqueous electrolyte secondary battery according to the present invention, the flame retardant is a phosphazene compound.

With this configuration, the flash point of the non-aqueous electrolyte solution can be raised by the flame retardant.

Preferably, in the non-aqueous electrolyte secondary battery according to the present invention, the negative-electrode active material is made of a carbon material such as graphite or hard carbon.

With this configuration, lithium ions can be extracted and/or inserted into the carbon material, and therefore, the non-aqueous electrolyte secondary battery can be charged and discharged. This configuration also enables the formation of the solid electrolyte interface film on the surface of the carbon material with the charging of the non-aqueous electrolyte secondary battery.

Preferably, the non-aqueous electrolyte secondary battery according to the present embodiment further includes a shrink tube that bundles the electrode body.

With this configuration, the shape of the electrode body can be stabilized. This configuration can also prevent the flame retardant contained in the non-aqueous electrolyte solution outside of the shrink tube from being flown and diffused into the electrode body, thereby being capable of suppressing the consumption of the flame retardant with the electrochemical reaction in the electrode active material.

The present invention also provides a method for producing a non-aqueous electrolyte secondary battery, the method comprising the steps of: impregnating a porous negative-electrode active material layer and a porous positive-electrode active material layer with a non-aqueous electrolyte solution by dipping an electrode body, which has a structure in which a negative electrode including the negative-electrode active material layer and a positive electrode including the positive-electrode active material layer are stacked with a separator interposed therebetween, into a non-aqueous electrolyte solution substantially free of a frame retardant; and placing a flame retardant and a non-aqueous electrolyte solution into an outer casing housing the positive electrode and the negative electrode.

The method for producing a non-aqueous electrolyte secondary battery according to the present invention comprises the step of impregnating a porous negative-electrode active material layer and a porous positive-electrode active material layer with a non-aqueous electrolyte solution by immersing an electrode body, which has a structure in which a negative electrode including the negative-electrode active material layer and a positive electrode including the positive-electrode active material layer are stacked with a separator interposed therebetween, into a non-aqueous electrolyte solution substantially free of a frame retardant. With this, a non-aqueous electrolyte solution substantially free of a flame retardant can be retained in the electrode body.

The method for producing a non-aqueous electrolyte secondary battery according to the present invention comprises the step of placing a flame retardant and a non-aqueous electrolyte solution into an outer casing housing the positive electrode and the negative electrode. With this, the flash point of the non-aqueous electrolyte solution in the outer casing can be raised, whereby safety of the non-aqueous electrolyte secondary battery can be enhanced. The non-aqueous electrolyte solution retained in the electrode body is difficult to move. Therefore, even when the non-aqueous electrolyte solution containing a flame retardant is injected into the outside of the electrode body retaining the non-aqueous electrolyte solution, the flame retardant is difficult to be flown and to be diffused in the non-aqueous electrolyte solution in the electrode body. Accordingly, a frame retardant concentration in the non-aqueous electrolyte solution in the electrode body can be made lower than a flame retardant concentration in the non-aqueous electrolyte solution between the electrode body and the outer casing. This can suppress a consumption of a flame retardant by an electrochemical reaction in the positive-electrode active material and the negative-electrode active material due to charging and discharging in the non-aqueous electrolyte secondary battery produced by the method for producing according to the present invention. Accordingly, a reduction in the flame retardant concentration in the non-aqueous electrolyte solution can be suppressed, even if the battery is repeatedly charged and discharged, resulting in that the drop in the flash point of the non-aqueous electrolyte solution can be suppressed even when the non-aqueous electrolyte secondary battery is used for a long time. Consequently, safety of the non-aqueous electrolyte secondary battery can be enhanced.

Preferably, the method for producing a non-aqueous electrolyte secondary battery according to the present invention further includes a step of charging the electrode body by applying a voltage between the positive electrode and the negative electrode with the state in which the electrode body is dipped into a non-aqueous electrolyte solution substantially free of a flame retardant.

With this configuration, an SEI that is a solid electrolyte interface film composed of a component derived from a non-aqueous electrolyte solution substantially free of a flame retardant can be formed on the surface of the positive-electrode active material or the negative-electrode active material. This can enhance life characteristics of the produced non-aqueous electrolyte secondary battery.

Preferably, in the method for producing a non-aqueous electrolyte secondary battery according to the present invention, the step of impregnating is a step of impregnating the electrode body with the non-aqueous electrolyte solution in the outer casing.

This configuration can simplify a production process, thereby being capable of reducing production cost.

Preferably, in the method for producing a non-aqueous electrolyte secondary battery according to the present invention, the step of impregnating is a step of impregnating the electrode body with the non-aqueous electrolyte solution in a container different from the outer casing.

With this configuration, more non-aqueous electrolyte solution substantially free of a flame retardant can be retained in the electrode body, whereby the difference between the flame retardant concentration in the non-aqueous electrolyte solution in the electrode body and the flame retardant concentration in the non-aqueous electrolyte solution between the electrode body and the outer casing can be increased.

Hereinafter, an embodiment of the present invention will be described with reference to the drawings. Structures shown in the drawings or the following descriptions are just exemplifications and the scope of the present invention is not limited thereto.

Structure of Non-Aqueous Electrolyte Secondary Battery

FIG. 1 is a schematic top view illustrating a non-aqueous electrolyte secondary battery according to the present embodiment, FIG. 2 is a schematic side view illustrating the non-aqueous electrolyte secondary battery according to the present embodiment, FIG. 3 is a schematic sectional view illustrating the non-aqueous electrolyte secondary battery taken along a dotted line A-A in FIG. 1, FIG. 4 is a schematic sectional view illustrating the non-aqueous electrolyte secondary battery taken along a dotted line B-B in FIG. 1, and FIG. 5 is a schematic sectional view illustrating the non-aqueous electrolyte secondary battery taken along a dashed-dotted line C-C in FIG. 2.

FIG. 6 is an explanatory view illustrating an electrode body included in the non-aqueous electrolyte secondary battery according to the present embodiment, FIG. 7(a) is a schematic plan view illustrating a positive electrode included in the non-aqueous electrolyte secondary battery according to the present embodiment, and FIG. 7(b) is a schematic sectional view illustrating the positive electrode taken along a dotted line D-D in FIG. 7(a). FIG. 8(a) is a schematic plan view illustrating a negative electrode included in the non-aqueous electrolyte secondary battery according to the present embodiment, and FIG. 8(b) is a schematic sectional view illustrating the negative electrode taken along a dotted line E-E in FIG. 8(a). FIG. 9 is a schematic sectional view illustrating a negative-electrode active material layer in a range F enclosed by a dotted line in FIG. 8.

A non-aqueous electrolyte secondary battery 20 according to the present embodiment includes an electrode body 12 having a structure in which a positive electrode 21 including a positive-electrode active material and a negative electrode 22 including a negative-electrode active material 33 are stacked with a separator 24 interposed therebetween; a non-aqueous electrolyte solution 5 containing a flame retardant; and an outer casing 17 accommodating the electrode body 12 and the non-aqueous electrolyte solution 5, wherein the non-aqueous electrolyte solution 5 in the electrode body 12 has a flame retardant concentration lower than a flame retardant concentration of the non-aqueous electrolyte solution 5 between the electrode body 12 and the outer casing 17.

Hereinafter, the non-aqueous electrolyte secondary battery 20 of the present embodiment will be described.

1. Outer Casing

The outer casing 17 may be made of a hard material or a soft material. A material that can popularly be used for a non-aqueous electrolyte secondary battery can be used for the non-aqueous electrolyte secondary battery of the present invention.

In the case of the outer casing made of a hard material, the material of the outer casing is not particularly limited, so long as it is not so greatly deformed even if the electrode body 12, a positive-electrode current collector 3, a negative-electrode current collector 4, and a non-aqueous electrolyte solution 5 are accommodated therein. Examples of the material of the outer casing 17 include a metal material such as aluminum, aluminum alloy, iron, iron alloy, or stainless, a material formed by plating nickel, tin, chromium, or zinc to the metal material, or a rigid plastic.

In the case of the outer casing made of a soft material, the material of the outer casing is not particularly limited, so long as the electrode body 12, the positive-electrode current collector 3, the negative-electrode current collector 4, and the non-aqueous electrolyte solution 5, which are accommodated therein, do not leak therefrom. For example, a laminate pouch can be used.

The outer casing 17 has a battery case 1 for accommodating the electrode body 12. The outer casing 17 may also have a lid member 2.

The battery case 1 can accommodate the electrode body 12, the positive-electrode current collector 3, the negative-electrode current collector 4, and the non-aqueous electrolyte solution 5 therein. The battery case 1 can also be bonded to the lid member 2.

The shape of the battery case 1 may be rectangle, cylindrical, a thin shape, or a coin shape.

The battery case 1 has an opening into which the electrode body 12 is inserted into the battery case 1. This opening is closed by the lid member 2. Thus, the electrode body 12 can be accommodated into the battery case 1.

The lid member 2 closes the opening formed on the battery case 1 for inserting the electrode body 12. The battery case 1 and the lid member 2 are bonded by a laser welding, resistance welding, ultrasonic welding, or caulking, or by use of an adhesive agent, to seal the battery case 1. The positive-electrode current collector 3 and the negative-electrode current collector 4 can be fixed to the lid member 2. The electrode body 12 can be connected to the positive-electrode current collector 3 and the negative-electrode current collector 4. With this, the lid member 2, the positive-electrode current collector 3, the negative-electrode current collector 4, and the electrode body 12 can be formed integral. The positive-electrode current collector 3, the negative-electrode current collector 4, and the electrode body 12, which are integrated, are put into the battery case 1, and the opening of the battery case 1 is closed by the lid member 2. Thus, the electrode body 12 connected to the positive-electrode current collector 3 and the negative-electrode current collector 4 can be accommodated into the outer casing 17. The non-aqueous electrolyte solution 5 can be injected into the outer casing 17 after the opening of the battery case 1 is closed by the lid member 2.

2. Non-Aqueous Electrolyte, Electrode Body

The non-aqueous electrolyte solution 5 is accommodated into the outer casing 17 together with the electrode body 12. Thus, the electrode body 12 is dipped in the non-aqueous electrolyte solution 5, so that a positive-electrode active material layer 25 and a negative-electrode active material layer 26 included in the electrode body 12 contain the non-aqueous electrolyte solution 5. The non-aqueous electrolyte solution 5 contains supporting electrolyte salts containing ions that move charges, such as lithium ions or sodium ions, as a solute. Therefore, charges can be moved between the positive-electrode active material and the negative-electrode active material via the non-aqueous electrolyte solution, and hence, the non-aqueous electrolyte secondary battery 20 can be charged and discharged.

At least a part of the non-aqueous electrolyte solution 5 in the outer casing 17 contains a flame retardant as a solute. With this, a flash point of the non-aqueous electrolyte solution 5 can be raised, and therefore, safety of the non-aqueous electrolyte secondary battery 20 can be enhanced.

The non-aqueous electrolyte solution 5 can contain ethylene carbonate.

When the non-aqueous electrolyte secondary battery is repeatedly charged and discharged, a component of the non-aqueous electrolyte solution might be consumed by an electrochemical reaction (for example, a formation reaction of an SEI) in the electrode active materials, and so, a flame retardant contained in the non-aqueous electrolyte solution might be consumed by the electrochemical reaction in the electrode active materials. With this, it is considered that the amount of the flame retardant to be consumed can be reduced by setting the flame retardant concentration in the non-aqueous electrolyte solution around the electrode active material to be lower than the other portions.

The flame retardant concentration in the non-aqueous electrolyte solution 5 in the electrode body 12 is lower than the flame retardant concentration in the non-aqueous electrolyte solution 5 between the electrode body 12 and the outer casing 17. With this configuration, the flame retardant in the non-aqueous electrolyte solution supplied to the positive-electrode active material layer or the negative-electrode active material layer is reduced. This prevents the consumption of the flame retardant due to an electrochemical reaction in the electrode active material. Therefore, the reduction in the flame retardant concentration in the non-aqueous electrolyte solution 5 can be prevented. The flame retardant concentration in the non-aqueous electrolyte solution 5 can be measured by extracting and analyzing the non-aqueous electrolyte solution 5 in the electrode body 12 and the non-aqueous electrolyte solution 5 between the outer casing 17 and the electrode body 12 after the battery is disassembled.

The non-aqueous electrolyte solution in the electrode body 12 means here a non-aqueous electrolyte solution retained in the electrode body 12, i.e., a non-aqueous electrolyte solution in pores of the electrode active material layer, a non-aqueous electrolyte solution in a gap between an electrode and a separator, and a non-aqueous electrolyte solution inside a fixing member such as a shrink tube 15 holding electrodes together.

The non-aqueous electrolyte solution between the electrode body and the outer casing means a non-aqueous electrolyte solution between the outermost separator that fixes the electrode body all together and the outer casing 17.

When a fixing member, such as the shrink tube 15, for fixing the electrode body 12 is provided, the non-aqueous electrolyte solution between the electrode body and the outer casing means a non-aqueous electrolyte solution between the fixing member and the outer casing 17.

The present embodiment describes, as one example, a structure in which the positive electrode 12 and the negative electrode 22 are stacked, and the separator 24 is disposed between the positive electrode 21 and the negative electrode 22. However, the present embodiment is applicable to a battery having other structures, for example, a battery whose electrode body 12 has a wound structure. When an opening is formed at the center of the wound structure, the inside of the opening is not considered as the inside of the electrode body 12. Specifically, a non-aqueous electrolyte solution in this opening is not included in the non-aqueous electrolyte solution in the electrode body, but corresponds to the non-aqueous electrolyte solution between the electrode body and the outer casing.

The non-aqueous electrolyte solution 5 in the pores of the positive-electrode active material layer 25 or the negative-electrode active material layer 26 may have a lower flame retardant concentration than that in the non-aqueous electrolyte solution 5 between the electrode body 12 and the outer casing 17. This prevents the consumption of the flame retardant due to an electrochemical reaction in the electrode active material. Therefore, the reduction in the flame retardant concentration in the non-aqueous electrolyte solution 5 can be prevented. The flame retardant concentration in the non-aqueous electrolyte solution 5 in the pores of the positive-electrode active material layer 25 or the negative-electrode active material layer 26 can be measured with a process in which the battery is disassembled to extract the positive electrode 21 or the negative electrode 22, and then, the non-aqueous electrolyte solution is extracted from the positive electrode 21 or the negative electrode 22 with a centrifuge or the like to analyze the flame retardant concentration.

Examples of a method of allowing the flame retardant concentration in the non-aqueous electrolyte solution 5 in the electrode body 12 to be lower than the flame retardant concentration in the non-aqueous electrolyte solution 5 between the electrode body 12 and the outer casing 17 include a method of dipping the electrode body 12 into a non-aqueous electrolyte solution 5a containing a flame retardant after a non-aqueous electrolyte solution 5b free of a flame retardant is retained in the electrode body 12.

The non-aqueous electrolyte solution can use carbonates, lactones, ethers, esters, etc. as a solvent. Two or more kinds of these solvents can be used as a mixture. Among these, especially a solvent prepared by mixing cyclic carbonate such as ethylene carbonate (EC) or propylene carbonate (PC) and chain carbonate such as diethyl carbonate (DEC) or dimethyl carbonate (DMC) is preferable.

The non-aqueous electrolyte solution is prepared by dissolving a lithium salt serving as a supporting electrolyte salt, such as $LiCF_3SO_3$, $LiAsF_6$, $LiClO_4$, $LiBF_4$, $LiPF_6$, LiBOB, $LiN(CF_3SO_2)_2$, or $LiN(C_2F_5SO_2)$, or a sodium salt solute such as $NaClO_4$, $NaPF_6$, $NaAsF_6$, $NaSbF_6$, $NaBF_4$, $NaCF_3SO_3$, $NaN(SO_2CF_3)_2$, a sodium salt of lower aliphatic carboxylic acid, or $NaAlCl_4$ in a solvent.

Examples of the flame retardant contained in the non-aqueous electrolyte solution include a phosphazene compound or a phosphoric ester compound. Examples of the phosphoric ester include triethyl phosphate, tripropyl phosphate, tributyl phosphate, triphenyl phosphate, tritolyl phosphate, and tris(trifluoroethyl) phosphate.

Examples of the phosphazene compound include a cyclic phosphazene derivative represented by $(NPR_2)_n$ substituted with a substituent R (wherein, n is 3 to 15, and examples of R include a halogen group such as fluorine, an alkoxy group such as an ethoxy group, propoxy group, or methoxy ethoxy methyl group, an alkoxy-substituted alkoxy group, or an aryl group such as a phenoxy group. Further, hydrogen in the above substituent or a side chain group can be substituted with a halogen element such as fluorine.) Examples of another phosphazene compound include a chain phosphazene derivative represented by, for example, $R$—$(PR_2$=$N)_m$—$PR$ (wherein, m is 1 to 20, and examples of R include a halogen group such as fluorine, an alkoxy group such as an ethoxy group, propoxy group, or methoxy ethoxy methyl group, an alkoxy-substituted alkoxy group, or an aryl group such as a phenoxy group. Further, hydrogen in the above substituent or a side chain group can be substituted with a halogen element such as fluorine.) which has a chain bind of phosphoric acid and nitrogen as a basic structure, and has a side chain group R added to phosphor.

Among these, a cyclic phosphazene derivative is preferable, and especially a derivative in which R is an alkoxy group and fluorine is preferable.

Preferably, the non-aqueous electrolyte solution used for forming an SEI on the surface of the negative-electrode active material 33 does not contain a flame retardant.

An additive agent such as VC (vinylene carbonate), PS (propane sultone), VEC (vinyl ethyl carbonate), or PRS (propene sultone) may be mixed singly in the non-aqueous electrolyte solution, or two or more kinds of these additive agents may be mixed, according to need.

The electrode body 12 causes a battery reaction with the non-aqueous electrolyte solution 5 filled in the outer casing 17. Due to this battery reaction, the non-aqueous electrolyte secondary battery 20 can be discharged and charged. The electrode body 12 includes the separator 24, and the positive electrodes 21 and the negative electrodes 22 disposed via the separator 24. As illustrated in FIG. 6, the electrode body 12 can be configured to include the separator 24 folded in zigzag, and the positive electrodes 21 and the negative electrodes 22, wherein the positive electrodes 21 and the negative electrodes 22 are disposed in valley folds of the separator 24, and each of the positive electrodes 21 and each of the negative electrodes 22 are disposed alternately with the separator 24 interposed therebetween. An end of the separator 24 may wrap a stacked body of the positive electrodes 21 and the negative electrodes 22 to completely cover the electrode body 12, and may be fixed with a tape.

In the present embodiment, the above structure is illustrated. However, a wound structure in which the positive electrode 21 and the negative electrode 22 disposed via a generally used separator 24 are winded, and a stacked structure in which the positive electrode 21 and the negative electrode 22 disposed via the individual separator 24 are stacked can be employed.

The separator 24 has a sheet-like structure, and is disposed between the positive electrode 21 and the negative electrode 22. The separator 24 can prevent a short-circuit current from flowing between the positive electrode 21 and the negative electrode 22. The separator 24 is not particularly limited, so long as it can transmit ions that move charges. For example, a microporous film of polyolefin can be used.

The positive electrode 21 includes a positive-electrode current collector sheet 27, and a positive-electrode active material layer 25 formed on both surfaces of the positive-electrode current collector sheet 27. The positive electrode 21 can be formed as illustrated in FIGS. 7(a) and (b), for example. It can be formed by forming the positive-electrode active material layer 25 on both surfaces of the rectangular positive-electrode current collector sheet 27. The positive electrode 21 can be formed to have an electrode connection portion 23 that is connected to the positive-electrode current collector 3. The electrode connection portion 23 in FIG. 7(a) can be formed such that the positive-electrode active material layer 25 is not formed on both surfaces of the positive-electrode current collector sheet 27 at the end of the positive electrode 21. The electrode connection portion 23 can also be formed such that a convex lug portion protruding outwardly from one end of the positive-electrode current collector sheet 27 is formed on this end, and the positive-electrode active material layer 25 is not formed on the lug portion.

The positive-electrode current collector sheet 27 is not particularly limited, so long as it has an electric conduction property, and has the positive-electrode active material layer 25 formed on its surface. For example, a metal foil is used. Preferably, an aluminum foil is used.

The positive-electrode active material layer 25 can be formed on the positive-electrode current collector sheet 27 by adding a conductive agent or binder to a positive-electrode active material by a known method such as a coating method. The positive-electrode active material layer 25 can be formed to have porosity. The positive-electrode active material can be a lithium transition metal composite oxide that can reversibly extract and insert lithium ions, such as $LiCoO_2$, $LiNiO_2$, $LiNi_xCo_{1-x}O_2$ (x=0.01 to 0.99), $LiMnO_2$, $LiMn_2O_4$, and $LiCo_xMn_yNi_zO_2$ (x+y+z=1), or olivine-type $LiFePO_4$ or $Li_xFe_{1-y}M_yPO_4$ (wherein $0.05 \leq x \leq 1.2$, $0 \leq y \leq 0.8$, and M is at least one or more elements selected from Mn, Cr, Co, Cu, Ni, V, Mo, Ti, Zn, Al, Ga, Mg, B, and Nb). These materials can be used singly, or two or more kinds can be used as a mixture. The positive-electrode active material can also be an material that can reversibly extract and insert sodium ions, and examples of such material include an oxide represented by $NaM^1{}_aO_2$ such as $NaFeO_2$, $NaMnO_2$, $NaNiO_2$ or $NaCoO_2$, an oxide represented by $Na_{0.44}Mn_{1-a}M^1{}_aO_2$, or an oxide represented by $Na_{0.7}Mn_{1-a}M^1{}_aO_{2.05}$ ($M^1$ is one or more kinds of transition metal element, $0 \leq a < 1$); an oxide represented by $Na_bM^2{}_cSi_{12}O_{30}$ ($M^2$ is one or more kinds of transition metal element, $2 \leq b \leq 6$, $2 \leq c \leq 5$) such as $Na_6Fe_2Si_{12}O_{30}$ or $Na_2Fe_5Si_{12}O_{30}$; an oxide represented by $Na_dM^3{}_eSi_6O_{18}$ ($M^3$ is one or more kinds of transition metal element, $3 \leq d \leq 6$, $1 \leq e \leq 2$) such as $Na_2Fe_2Si_6O_{18}$ or $Na_2MnFeSi_6O_{18}$; an oxide represented by $Na_fM^4{}_gSi_2O_6$ ($M^4$ is one or more elements selected from a transition metal element, Mg, and Al, $1 \leq f \leq 2$, $1 \leq g \leq 2$) such as $Na_2FeSiO_6$; a phosphate such as $NaFePO_4$ or $Na_3Fe_2(PO_4)_3$; a borate such as $NaFeBO_4$ or $Na_3Fe_2(BO_4)_3$; or a fluoride represented by $Na_hM^5F_6$ ($M^5$ is one or more transition metal elements, $2 \leq h \leq 3$) such as $Na_3FeF_6$ or $Na_2MnF_6$. These materials can be used singly, or two or more kinds can be used as a mixture.

The negative electrode 22 includes a negative-electrode current collector sheet 28, and a negative-electrode active material layer 26 formed on both surfaces of the negative-electrode current collector sheet 28. The negative electrode 22 can be formed as illustrated in FIGS. 8(a) and 8(b), for example. It can be formed by forming the negative-electrode active material layer 26 on both surfaces of the rectangular negative-electrode current collector sheet 28. The negative electrode 22 can be formed to have an electrode connection portion 23 that is connected to the negative-electrode current collector 4. The electrode connection portion 23 in FIG. 8(a) can be formed such that the negative-electrode active material layer 26 is not formed on both surfaces of the negative-electrode current collector sheet 28 at the end of the negative electrode 22. The electrode connection portion 23 can also be formed such that a lug portion similar to the above lug portion for the positive electrode 21 is formed on one end of the negative-electrode current collector sheet 28, and the negative-electrode active material layer 26 is not formed on the lug portion.

The negative-electrode current collector sheet 28 is not particularly limited, so long as it has an electric conduction property, and has the negative-electrode active material layer 26 formed on its surface. For example, a metal foil is used. Preferably, a copper foil is used.

The negative-electrode active material layer 26 can be formed on the negative-electrode current collector sheet 28 by adding a conductive agent or binder to a negative-electrode active material by a known method such as a coating method. The negative-electrode active material layer 26 can be formed to include particulate negative-electrode active materials and have porosity.

In the case of a lithium ion secondary battery, examples of the material for the negative-electrode active material include graphite, partially graphitized carbon, $LiTiO_4$, and Sn alloy. These materials can be used singly, or two or more kinds can be used as a mixture. In the case of a sodium ion secondary battery, examples of the material for the negative-electrode active material include graphite, partially graphitized carbon, and hard carbon. These materials can be used singly, or two or more kinds can be used as a mixture.

The negative electrode 22 can include the solid electrolyte interface film 35 on the surface of the negative-electrode active material 33. The solid electrolyte interface film 35 is an SEI (Solid Electrolyte Interface), for example. The SEI may be formed on the surface of the positive-electrode active material included in the positive electrode 21. In addition, the SEI formed on the surface of the positive-electrode active material preferably has a portion made of a component derived from a non-aqueous electrolyte solution substantially free of a flame retardant, and further, the SEI is preferably made of a component derived from a non-aqueous electrolyte solution substantially free of a flame retardant.

The negative electrode in the lithium ion secondary battery according to the present embodiment, which is an example of a non-aqueous electrolyte secondary battery, will be described. When the negative-electrode active material 33 is a graphite particle 32, the negative-electrode active material layer 26 has porosity, the non-aqueous electrolyte solution 5 is permeated into the pores in the negative-electrode active material layer 26, and the SEI 35 is formed on the surface of the graphite particle 32, the cross-section of the negative-electrode active material layer 26 is considered to become the one illustrated in FIG. 9.

Whether the SEI is formed on the surface of the negative-electrode active material 33 or on the surface of the positive-electrode active material can be confirmed by analyzing the surface of the negative-electrode active material 33 or the surface of the positive-electrode active material with an atom force microscope (AFM), a scanning tunneling microscope (STM), or the like. The components of the SEI can be checked with a secondary ion mass spectrometry (SIMS), an X-ray photoelectron spectroscopy (XPS), an Auger electron spectroscopy (AES), or the like.

Although the structure of the SEI has not yet clearly been identified, covering the surface of the negative-electrode active material 33 or the surface of the positive-electrode active material with the SEI can prevent an excessive reaction between the electrode active material and the electrolyte solution, and therefore, can stabilize the charging and discharging characteristics of the lithium ion secondary battery 20.

The SEI is formed on the surface of the negative-electrode active material or on the surface of the positive-electrode active material with a decomposition of the electrolyte contained in the non-aqueous electrolyte solution around the surface of the electrode active material or the solvent of the non-aqueous electrolyte solution, or a reaction between the solvent and lithium ions, which are side reactions upon charging the lithium ion secondary battery, especially upon a first charging of the electrode (pre-charging in the embodiment of the present invention). Therefore, the SEI is composed of a component derived from the non-aqueous electrolyte solution around the surface of the electrode active material. Accordingly, when the non-aqueous electrolyte solution around the surface of the electrode active material upon the formation of the SEI contains cyclic/chain carbonates such as EC, PC, DEC, or DMC, Li salt, flame retardant, or vinylene carbonate (VC), the SEI formed by using this non-aqueous electrolyte solution as a raw material is considered to include these components or the components generated by the chemical reaction of these components. Accordingly, when the non-aqueous electrolyte solution around the surface of the electrode active material upon the formation of the SEI contains a flame retardant, the SEI is considered to contain the flame retardant or a component generated by the chemical reaction of the flame retardant. When the non-aqueous electrolyte solution around the surface of the electrode active material upon the formation of the SEI does not contain a flame retardant, the SEI is not considered to contain the flame retardant or a component generated by the chemical reaction of the flame retardant.

It is considered that the SEI is formed on the surface of the electrode active material mainly upon the first charging of the electrode (pre-charging in the embodiment of the present invention). However, when the lithium ion secondary battery is repeatedly charged and discharged, the SEI is damaged and deteriorated, though little by little. The deteriorated portion of the SEI is newly reproduced with the non-aqueous electrolyte solution around the surface of the electrode active material as a raw material. For the reproduction, supporting electrolyte salts, electrolyte solution, additive agents, and the like are consumed. Specifically, it is conceivable that, during a long-term use of the battery, ion species for moving charges or the amount of the electrolyte solution are decreased, and therefore, the characteristics of the battery are deteriorated with its operating time.

It is considered that the speed of the deterioration of the SEI is determined by quality of the SEI. The SEI is composed of the component derived from the non-aqueous electrolyte solution, and it is a polymer in which carbonate-derived structures are linked. When a structure derived from an impurity such as a flame retardant is inserted therein, it is considered that the structure of the SEI is disordered to deteriorate the quality. In light of this, with the electrolyte solution containing a flame retardant, it is considered that a structure derived from the flame retardant is inserted into the SEI, and this deteriorates the quality of the SEI and accelerates the deterioration of the SEI. Especially, it is conceivable that, if the quality of the SEI initially formed is excellent, deterioration is difficult to occur, and impurities are difficult to be inserted during the reproduction, and therefore, more effective result will be produced.

It is considered that the SEI forming reaction is carried out in an electrolyte solution containing no flame retardant in order to enhance the quality of the SEI. Especially, since the SEI is formed most often upon the first charging of the electrode, it is more effective to enhance the quality of the SEI formed upon the first charging of the electrode.

The SEI 35 on the negative-electrode active material 33 included in the negative electrode 22 of the lithium ion secondary battery 20 can be configured to have a portion composed of a component derived from a non-aqueous electrolyte solution 5b substantially free of a flame retardant. Therefore, the concentration of the flame retardant or the concentration of the component produced by the chemical reaction of the flame retardant contained in the SEI 35 becomes lower than that of the SEI formed by using the non-aqueous electrolyte solution containing a flame retardant as a raw material.

The SEI 35 may be formed to include a portion composed of a component derived from the non-aqueous electrolyte solution 5b substantially free of a flame retardant and to partly include a portion composed of a component derived from the non-aqueous electrolyte solution 5b substantially containing a flame retardant. However, it is preferable that the SEI 35 is made of only the portion composed of a component derived from the non-aqueous electrolyte solution 5b substantially free of a flame retardant.

Whether or not the SEI 35 has the portion composed of the component derived from the non-aqueous electrolyte solution 5b substantially free of a flame retardant can be checked as follows. Specifically, a component of an SEI on a negative-electrode active material in a lithium ion secondary battery to be tested is checked, and then, the analysis result of this component, an analysis result of a component of an SEI composed of only a component derived from a non-aqueous electrolyte solution free of a flame retardant, and an analysis result of a component of an SEI composed of only a component derived from a non-aqueous electrolyte solution containing a flame retardant are compared.

Next, a method for producing a non-aqueous electrolyte secondary battery 20 in which a flame retardant concentration in the non-aqueous electrolyte solution in the electrode body 12 is lower than the flame retardant concentration in the non-aqueous electrolyte solution between the electrode body 12 and the outer casing 17 will be described. FIGS. 10 to 13 are process diagrams of the method for producing the non-aqueous electrolyte secondary battery according to the present embodiment.

The method for producing the non-aqueous electrolyte secondary battery 20 according to the present embodiment includes the steps of: impregnating a porous negative-electrode active material layer 26 and a porous positive-electrode active material layer 25 with a non-aqueous electrolyte solution 5b by dipping an electrode body 12, which has a structure in which a negative electrode 22 including the negative-electrode active material layer 26 and a positive electrode 21 including the positive-electrode active material layer 25 are stacked with a separator 24 interposed therebetween, into a non-aqueous electrolyte solution 5b substantially free of a frame retardant; and placing a flame retardant and a non-aqueous electrolyte solution into an outer casing 17 accommodating the positive electrode 21 and the negative electrode 22.

The step of impregnating the porous negative-electrode active material layer 26 and the porous positive-electrode active material layer 25 with the non-aqueous electrolyte solution 5b by dipping the electrode body 12, which has a stacked structure in which the negative electrode 22 including the negative-electrode active material layer 26 and the positive electrode 21 including the positive-electrode active material layer 25 are stacked with the separator 24 interposed therebetween, into the non-aqueous electrolyte solution 5b substantially free of a frame retardant allows the non-aqueous electrolyte solution 5b substantially free of a flame retardant to be retained in the positive-electrode active material layer 25, the negative-electrode active material layer 26 and the separator 24 in the electrode body 12; between the separator 24 and the positive electrode 21; and between the separator 24 and the negative electrode 22.

The step of placing a flame retardant and a non-aqueous electrolyte solution into the outer casing 17 accommodating the positive electrode 21 and the negative electrode 22 can raise the flash point of the non-aqueous electrolyte solution 5 in the outer casing 17, whereby safety of the non-aqueous electrolyte secondary battery can be enhanced. The non-aqueous electrolyte solution 5 retained in the electrode body 12 is difficult to move. Therefore, the flame retardant is difficult to be diffused into the non-aqueous electrolyte solution 5 in the electrode body 12, even if the non-aqueous electrolyte solution 5 containing a flame retardant is injected to the outside of the electrode body 12 retaining the non-aqueous electrolyte solution 5. In addition, since the non-aqueous electrolyte solution 5a containing a flame retardant has higher viscosity than the non-aqueous electrolyte solution 5b free of a flame retardant, the flame retardant is difficult to be inserted into the electrode body 12.

With this, the flame retardant concentration in the non-aqueous electrolyte solution in the electrode body 12 can be set lower than the flame retardant concentration in the non-aqueous electrolyte solution between the electrode body 12 and the outer casing 17. This can suppress the consumption of the flame retardant caused by the electrochemical reaction in the positive-electrode active material or the negative-electrode active material 33 due to the charging and discharging of the produced non-aqueous electrolyte secondary battery 20. Accordingly, the reduction in the flame retardant concentration of the non-aqueous electrolyte solution 5 caused by the repeated charging and discharging of the battery can be suppressed, resulting in that a drop of the flash point of the non-aqueous electrolyte solution 5 can be suppressed even if the non-aqueous electrolyte secondary battery 20 is used for a long time.

The state in which the surface of the positive-electrode active material included in the positive electrode 21 and the surface of the negative-electrode active material 33 included in the negative electrode are in contact with the non-aqueous electrolyte solution 5 substantially free of a flame retardant is formed, whereby the non-aqueous electrolyte solution 5 around the surface of the positive-electrode active material and the non-aqueous electrolyte solution 5 around the surface of the negative-electrode active material 33 can be the non-aqueous electrolyte solution 5 substantially free of a flame retardant. When charging is performed with this state with an application of a voltage between the positive electrode 21 and the negative electrode 22, a solid electrolyte interface film composed of a component derived from the non-aqueous electrolyte solution 5 substantially free of a flame retardant can be formed on the surface of the positive-electrode active material or the negative-electrode active material 33.

For example, as illustrated in the step A in FIG. 10, the electrode body 12 formed by stacking the positive electrode 21 and the negative electrode 22 via the separator 24 is fixed to the lid member 2, and then, this electrode body 12 can be dipped into the non-aqueous electrolyte solution 5b, which is substantially free of a flame retardant and stored in a pretreatment container 37. With this, the non-aqueous electrolyte solution 5b stored in the pretreatment container 37 can be permeated into the positive-electrode active material layer 25 and the negative-electrode active material layer 26, and this can form a state in which the surface of the positive-electrode active material and the surface of the negative-electrode active material 33 are brought into contact with the non-aqueous electrolyte solution 5b substantially free of a flame retardant. In addition, the non-aqueous electrolyte solution 5b is retained in the electrode body 12. As illustrated in the step A in FIG. 10, a voltage is applied between the positive electrode 21 and the negative electrode 22 with this state to perform pre-charging. With this, a solid electrolyte interface film composed of a component derived from the non-aqueous electrolyte solution 5b substantially free of a flame retardant can be formed on the surface of the positive-electrode active material or the negative-electrode active material 33. After the non-aqueous electrolyte solution 5b is retained in the electrode body 12, the electrode body 12 removed from the pretreatment container 37 is accommodated into the battery case 1 as illustrated in the step B in FIG. 10, and then, the non-aqueous electrolyte solution 5a containing a flame retardant is injected into the battery case 1 as illustrated in the step C in FIG. 10. Thus, the non-aqueous electrolyte secondary battery can be produced. In this case, the flame retardant concentration in the non-aqueous electrolyte solution 5 in the electrode body 12 is lower than the flame retardant concentration in the non-aqueous electrolyte solution between the electrode body 12 and the battery case 1.

In the present embodiment, the non-aqueous electrolyte solution 5a containing a flame retardant dissolved therein is injected into the battery case 1. However, a flame retardant and the non-aqueous electrolyte solution 5 may be separately injected into the battery case 1, and the flame retardant may be dissolved in the non-aqueous electrolyte solution 5 in the battery case 1. Such modification can similarly be applied to a method for producing described later.

Alternatively, as illustrated in the step A in FIG. 11, for example, the electrode body 12 formed by stacking the positive electrode 21 and the negative electrode 22 via the separator 24 is fixed to the lid member 2, and then, this electrode body 12 can be dipped into the non-aqueous electrolyte solution 5b, which is free of a flame retardant and stored in the pretreatment container 37. With this, the non-aqueous electrolyte solution 5b stored in the pretreatment container 37 can be permeated into the positive-electrode active material layer 25 and the negative-electrode active material layer 26, and this can form a state in which the surface of the positive-electrode active material and the surface of the negative-electrode active material 33 are brought into contact with the non-aqueous electrolyte solution 5b substantially free of a flame retardant. In addition, the non-aqueous electrolyte solution 5b is retained in the electrode body 12. After the non-aqueous electrolyte solution 5b is retained in the electrode body 12, the electrode body 12 removed from the pretreatment container 37 is accommodated into the battery case 1 as illustrated in the step B in FIG. 11, and then, the non-aqueous electrolyte solution 5a containing a flame retardant is injected into the battery case 1 as illustrated in the step C in FIG. 11. Thus, the non-aqueous electrolyte secondary battery can be produced. In this case, before the non-aqueous electrolyte solution 5a containing a flame retardant is injected into the battery case 1, the non-aqueous electrolyte solution 5b free of a flame retardant is permeated and retained in the electrode body 12. With this, the flame retardant can hardly be permeated into the positive-electrode active material layer 25 and the negative-electrode active material layer 26, and therefore, the surface of the positive-electrode active material and the surface of the negative-electrode active material 33 keep in contact with the non-aqueous electrolyte solution 5 substantially free of a flame retardant. Then, as illustrated in the step D in FIG. 11, a voltage is applied between the positive electrode 21 and the negative electrode 22 with this state to perform pre-charging. With this, a solid electrolyte interface film composed of a component derived from a non-aqueous electrolyte solution substantially free of a flame retardant can be formed on the surface of the positive-electrode active material or the negative-electrode active material. In this case, the flame retardant concentration in the non-aqueous electrolyte solution 5 in the electrode body 12 becomes lower than the flame retardant concentration in the non-aqueous electrolyte solution between the electrode body 12 and the battery case 1.

For example, as illustrated in the step A in FIG. 12, the electrode body 12 produced by stacking the positive electrode 21 and the negative electrode 22 via the separator 24 is fixed to the lid member 2, and the electrode body 12 is stored in the battery case 1. Thereafter, as illustrated in the step B in FIG. 12, the non-aqueous electrolyte solution 5*b* free of a flame retardant is injected into the battery case 1 to allow the lower part of the electrode body 12 to be dipped in the non-aqueous electrolyte solution 5*b*. When this state is kept for a certain period of time, the non-aqueous electrolyte solution 5*b* is permeated into the electrode body 12 due to the capillary action, and this can form the state in which the surface of the positive-electrode active material and the surface of the negative-electrode active material are brought into contact with the non-aqueous electrolyte solution 5*b* free of a flame retardant. In addition, the non-aqueous electrolyte solution 5*b* is retained in the electrode body 12. After the non-aqueous electrolyte solution 5*b* is permeated into the electrode body 12, the non-aqueous electrolyte solution 5*a* containing a flame retardant is injected into the battery case 1 as illustrated in the step C in FIG. 12. Thus, the non-aqueous electrolyte secondary battery can be produced. In this case, before the non-aqueous electrolyte solution 5*a* containing a flame retardant is injected into the battery case 1, the non-aqueous electrolyte solution 5*b* free of a flame retardant is permeated and retained in the positive-electrode active material layer 25 and the negative-electrode active material layer 26. With this, the flame retardant can hardly be permeated into the positive-electrode active material layer 25 and the negative-electrode active material layer 26, and therefore, the surface of the positive-electrode active material and the surface of the negative-electrode active material 33 keep in contact with the non-aqueous electrolyte solution 5 substantially free of a flame retardant. Then, as illustrated in the step D in FIG. 12, a voltage is applied between the positive electrode 21 and the negative electrode 22 with this state to perform pre-charging. With this, a solid electrolyte interface film composed of a component derived from a non-aqueous electrolyte solution substantially free of a flame retardant can be formed on the surface of the positive-electrode active material or the negative-electrode active material 33. In this case, the flame retardant concentration in the non-aqueous electrolyte solution 5 in the electrode body 12 becomes lower than the flame retardant concentration in the non-aqueous electrolyte solution between the electrode body 12 and the battery case 1. A portion of the non-aqueous electrolyte solution 5*b* in the battery case 1 may be discharged to adjust the amount of the non-aqueous electrolyte solution 5, before the non-aqueous electrolyte solution 5*a* containing a flame retardant is injected into the battery case 1.

In addition, as illustrated in the step A in FIG. 13, the electrode body 12 produced by stacking the positive electrode 21 and the negative electrode 22 via the separator 24 is fixed to the lid member 2, and the electrode body 12 is stored in the battery case 1. Thereafter, as illustrated in the step B in FIG. 13, the non-aqueous electrolyte solution 5*b* free of a flame retardant is injected into the battery case 1 to allow substantially the whole electrode body 12 to be dipped in the non-aqueous electrolyte solution 5*b*. With this, the non-aqueous electrolyte solution 5*b* is permeated into the positive-electrode active material layer 25 and the negative-electrode active material layer 26, and this can form the state in which the surface of the positive-electrode active material and the surface of the negative-electrode active material 33 are brought into contact with the non-aqueous electrolyte solution 5*b* free of a flame retardant. In addition, the non-aqueous electrolyte solution 5*b* is retained in the electrode body 12. Then, as illustrated in the step C in FIG. 13, a voltage is applied between the positive electrode 21 and the negative electrode 22 with this state to perform pre-charging. With this, a solid electrolyte interface film composed of a component derived from a non-aqueous electrolyte solution free of a flame retardant can be formed on the surface of the positive-electrode active material or the negative-electrode active material 33. After the SEI is formed, the non-aqueous electrolyte solution 5*b* in the battery case 1 is discharged as illustrated in the step D in FIG. 13, and then, the non-aqueous electrolyte solution 5*a* containing a flame retardant is injected into the battery case 1 as illustrated in the step E in FIG. 13. Thus, the non-aqueous electrolyte secondary battery can be produced. In this case, the flame retardant concentration in the non-aqueous electrolyte solution 5 in the electrode body 12 becomes lower than the flame retardant concentration in the non-aqueous electrolyte solution between the electrode body 12 and the battery case 1.

In the non-aqueous electrolyte secondary battery produced with these methods, the flame retardant concentration in the non-aqueous electrolyte solution 5 in the electrode body 12 is lower than the flame retardant concentration in the non-aqueous electrolyte solution between the electrode body 12 and the battery case 1. With this, the consumed amount of the flame retardant due to the electrochemical reaction in the electrode active materials can be reduced, and therefore, the situation in which the flash point of the non-aqueous electrolyte solution 5 is lowered due to the reduction in the flame retardant concentration in the non-aqueous electrolyte solution 5 can be prevented.

In the non-aqueous electrolyte secondary battery produced with these methods, the solid electrolyte interface film composed of a component derived from the non-aqueous electrolyte solution substantially free of a flame retardant is formed upon pre-charging. With this, the solid electrolyte interface film can be formed to have excellent quality. This can prevent the deterioration in the quality of the solid electrolyte interface film and the acceleration in the deterioration of the solid electrolyte interface film, which are caused because the component derived from the flame retardant is inserted into the solid electrolyte interface film. Accordingly, the reduction in the battery capacity can be suppressed, even if the non-aqueous electrolyte secondary battery is used to be repeatedly charged and discharged. Consequently, life characteristics such as cycle characteristics and floating charge characteristics can be enhanced.

Since the non-aqueous electrolyte solution 5 in the battery case 1 contains a flame retardant, a flash point of the non-aqueous electrolyte solution 5 is high, whereby safety of the non-aqueous electrolyte secondary battery is high. In addition, it is considered that high quality of the solid electrolyte interface film can suppress consumption of the flame retardant in the non-aqueous electrolyte solution. Accordingly, the reduction in the concentration of the flame retardant in the non-aqueous electrolyte solution caused by the repeated charging and discharging can be suppressed. With this, safety of the non-aqueous electrolyte secondary battery can further be enhanced.

A part of the solid electrolyte interface film formed upon pre-charging is considered to be damaged, because the shape of the negative-electrode active material 33 is changed with the charging and discharging of the non-aqueous electrolyte secondary battery. The solid electrolyte interface film is considered to be newly formed on this damaged portion from the non-aqueous electrolyte solution 5 upon the subsequent charging. The newly formed solid electrolyte interface film might be composed of a component derived from the non-aqueous electrolyte solution containing a flame retardant. However, it is considered that most of the solid electrolyte interface film formed upon pre-charging remains on the surface of the negative-electrode active material.

Besides the above methods, examples of a method for producing a lithium ion non-aqueous electrolyte secondary battery 20 in which a flame retardant concentration in the non-aqueous electrolyte solution in the electrode body 12 is lower than a flame retardant concentration in the non-aqueous electrolyte solution between the electrode body 12 and the outer casing 17 include a method in which a flame retardant is applied onto an inner face of the outer casing, an electrolyte solution free of a flame retardant is injected after a battery is assembled, and a difference in concentration is generated by slowly dissolving the flame retardant into the electrolyte solution; and a method in which a flame retardant is encapsulated into a sustained release capsule, the resultant is mixed into an electrolyte solution, and a difference in concentration is generated by slowly dissolving the flame retardant into the electrolyte solution. It is obvious that the effect similar to the effect of the present invention can be obtained by producing a non-aqueous electrolyte secondary battery with these methods.

3. Positive-Electrode Current Collector, Negative-Electrode Current Collector

The positive-electrode current collector 3 is a member electrically connecting the positive electrode 21 included in the electrode body 12 to an external connection terminal 8a.

The negative-electrode current collector 4 is a member electrically connecting the negative electrode 22 included in the electrode body 12 to an external connection terminal 8b.

The current collector 7 (the positive-electrode current collector 3 or the negative-electrode current collector 4) has a plate-like base portion fixed to the outer casing 17 and a plate-like leg portion extending from the base portion. The current collector 7 can also be configured to include a projection portion 31 projecting from the base portion and penetrating through the opening formed on the lid member 2.

The materials of the positive-electrode current collector 3 and the negative-electrode current collector 4 are not particularly limited. For example, the positive-electrode current collector 3 can be made of aluminum, and the negative-electrode current collector 4 can be made of copper.

A method for producing the positive-electrode current collector 3 and the negative-electrode current collector 4 is not particularly limited. For example, they can be produced by press working of a metal plate. A metal plate having a thickness of 1.5 mm or more and 2.5 mm or less can be used for the metal plate.

The base portion of the positive-electrode current collector 3 and the base portion of the negative-electrode current collector 4 can be fixed to the lid member 2. The method of fixing the base portion of the current collector is not particularly limited, so long as the base portion can be fixed such that the positive-electrode current collector 3 or the negative-electrode current collector 4 can be connected to an external wiring. For example, the base portion can be fixed as illustrated in the sectional view of FIG. 3. In the non-aqueous electrolyte secondary battery 20 illustrated in FIG. 3, the projection portion 31 of the current collector 7 is inserted into the opening of the lid member 2 and the opening of the external connection terminal 8, and the projection portion 31 is caulked to form the current collector 7, the lid member 2, and the external connection terminal 8 integral with one another. With this configuration of the non-aqueous electrolyte secondary battery 20, the current collector 7 can be fixed to the lid member 2 with the current collector 7 being electrically connected to the external connection terminal 8. Thus, the non-aqueous electrolyte secondary battery 20 can be charged and discharged via the external connection terminals 8a and 8b.

In the non-aqueous electrolyte secondary battery 20 illustrated in FIG. 3, an internal insulating member 11 is provided between the inside of the lid member 2 and the current collector 7, while an external insulating member 10 is provided between the outside of the lid member 2 and the external connection terminal 8. In addition, a packing 13 is provided between the opening of the lid member 2 and the projection portion 31. This configuration of the non-aqueous electrolyte secondary battery 20 can prevent the leak current from flowing through the lid member 2. This configuration can also prevent the electrolyte solution 5 from leaking from the opening of the lid member 2.

In the non-aqueous electrolyte secondary battery 20 illustrated in FIG. 3, the internal insulating member 11, the external insulating member 10, and the packing 13 are formed integral with the current collector 7, the lid member 2, and the external connection terminal 8.

The leg portion of the current collector 7 has a shape in which the end of the base portion extends to project from the base portion. The leg portion may have a rod-like shape or a plate-like shape. The leg portion may be formed simultaneous with the current collector 7 by processing a single metal plate, or may be formed by bonding another metal plate to the base portion.

It is only necessary that at least one leg portion is formed to one base portion. However, two or more leg portions may also be formed. The leg portion may be branched.

The leg portion has a connection portion to which the electrode (positive electrode 21 or the negative electrode 22) is connected and a curved portion formed between the base portion and the connection portion.

The electrode connection portion 23 of the positive electrode 21 is connected to the connection portion of the positive-electrode current collector 3, while the electrode connection portion 23 of the negative electrode 22 is connected to the connection portion of the negative-electrode current collector 4. Due to the connection portion of the current collector, the contact area between the positive-electrode current collector 3 and the positive electrode 21 or between the negative-electrode current collector 4 and the negative electrode 22 can be increased, whereby a conductive resistance can be reduced.

The configuration in which the connection portion is formed enables the connection with the current collector 7 without bending the electrode plate of the electrode body 12, and this can prevent excessive force from being applied to the electrode body 12.

The method of bonding the electrode connection portion 23 to the connection portion includes ultrasonic welding, spot welding, and laser welding, for example.

A plurality of electrode connection portions 23 of the positive electrodes 21 can be connected to the connection portion of the positive-electrode current collector 3, and a plurality of electrode connection portions 23 of the negative electrodes 22 can be connected to the connection portion of the negative-electrode current collector 4. In this case, a plurality of electrode connection portions 23 can be connected to the electrode connection portion 23 of the current collector 7 as superimposed.

4. Shrink Tube

The non-aqueous electrolyte secondary battery 20 can be provided with the shrink tube 15 that bundles the electrode body 12, the positive-electrode current collector 3, and the negative-electrode current collector 4 together.

The shrink tube 15 is made of a tube-shaped resin film, and bundles the electrode body 12, the positive-electrode current collector 3, and the negative-electrode current collector 4 together by thermal shrinkage. The shrink tube 15 also covers the electrode body 12, the positive-electrode current collector 3, and the negative-electrode current collector 4.

The shrink tube 15 may have a heat-sealed seam joint or may be a seamless tube having no seam joint. The shrink tube 15 is capable of suppressing bulges or displacement of the electrode body 12 and of preventing the positive electrodes 21 and the negative electrodes 22 in the electrode body 12 to be separated from each other. Especially in the case where the electrode body 12 has a stack structure, the shrink tube 15 functions as a component for fixing the positive electrodes 21 and the negative electrodes 22 or as a member for maintaining a shape of the electrode body 12.

A material for the film constituting the shrink tube 15 is a thermally shrinkable resin such as polyethylene, polypropylene, polyolefin, polyvinyl chloride (PVC), polyethylene terephthalate (PET), or a fluorinated resin (such as FEP or PTFE). The thermally shrunken tube 15 is capable of increasing closeness of the encompassed positive-electrode current collector 3, negative-electrode current collector 4, and electrode body 12 by bundling the positive-electrode current collector 3, the negative-electrode current collector 4, and the electrode body 12 together, with the result that the thermally shrunken tube is capable of suppressing effects on junctions between the electrode body 12 and the current collectors caused by vibrations applied to the lithium ion battery. The film constituting the shrink tube 15 may be 30 μm or more to 200 μm or less in thickness.

Charging-Discharging Cycle Test of Lithium Ion Secondary Battery Serving as Non-Aqueous Electrolyte Secondary Battery The electrode body 12 illustrated in FIG. 6 was assembled by using the positive electrodes 21 using lithium iron phosphate as a positive-electrode active material, the negative electrodes 22 using graphite as a negative-electrode active material, and the separator 24. The separator 24 was folded in zigzag. The positive electrode 21 and the negative electrode 22 were disposed in valley folds of the separator 24, and each of the positive electrodes 21 and each of the negative electrodes 22 were disposed alternately with the separator interposed therebetween. The separator 24 was disposed to completely cover the electrode active material layers, and taped at its end. Thereafter, the ends of the positive electrodes 21 were simultaneously welded to the positive-electrode current collector 3 fixed to the lid member 2, and the ends of the negative electrodes 22 were simultaneously welded to the negative-electrode current collector 4 fixed to the lid member 2. Then, the electrode body 12, the positive-electrode current collector 3, and the negative-electrode current collector 4 were fixed with the shrink tube 15. Thereafter, the electrode body 12 and the non-aqueous electrolyte solution 5 were placed in the battery case 1. Thus, the lithium ion secondary battery illustrated in FIGS. 1 to 5 was produced.

Under the condition in which a pre-charging method was changed or an amount of a flame retardant in the used non-aqueous electrolyte solution was changed, four different lithium ion secondary batteries A to D were prepared.

As illustrated in FIG. 10, the battery A as an example 1 was pre-charged in the state in which the electrode body 12 already fixed with the shrink tube 15 was placed into the non-aqueous electrolyte solution $5b$, which was stored in the pretreatment container 37 and did not contain a flame retardant, to allow the electrode body 12 to retain the non-aqueous electrolyte solution $5b$. The used non-aqueous electrolyte solution $5b$ was prepared by mixing 1.5 mol/L of $LiPF_6$ serving as a supporting electrolyte salt and 1 wt % of VC as an additive agent into a solvent of EC:DEC:EMC=3:6:1. The pre-charging was conducted for 30 minutes at room temperature and 0.4 C.

The electrode body 12 that was already pre-charged was removed from the non-aqueous electrolyte solution $5b$ stored in the pretreatment container 37, placed into the battery case 1, and sealed. Then, a solution prepared by adding 1.5 mol/L of $LiPF_6$ as a supporting electrolyte salt, 1 wt % of VC as an additive agent, and ethoxy pentafluoro cyclophosphazene as a flame retardant to a solvent of EC:DEC:EMC=3:6:1 as the non-aqueous electrolyte solution $5a$ containing a flame retardant was injected into the battery case 1 such that the flame retardant concentration in the electrolyte solution in the battery case 1 became 6 wt %. Thus, the battery A was produced.

In the battery A, it is considered that the flame retardant concentration in the non-aqueous electrolyte solution in the electrode body 12 is lower than the flame retardant concentration in the non-aqueous electrolyte solution between the electrode body 12 and the battery case 1. In addition, pre-charging was performed with the state in which the non-aqueous electrolyte solution $5b$ free of a flame retardant was brought into contact with the surface of the positive-electrode active material and the surface of the negative-electrode active material. Therefore, it is considered that a solid electrolyte interface film free of a component derived from a flame retardant is formed on the surface of the positive-electrode active material or the negative-electrode active material.

In the battery B as an example 2, the electrode body 12 already fixed with the shrink tube 15 was placed into the battery case 1, and this battery case 1 was sealed with the lid member 2. Thereafter, a non-aqueous electrolyte solution $5b$ prepared by mixing 1.5 mol/L of $LiPF_6$ serving as a supporting electrolyte salt and 1 wt. % of VC as an additive agent into a solvent of EC:DEC:EMC=3:6:1 without containing a flame retardant was injected into the battery case 1 to a half of the whole volume of the non-aqueous electrolyte solution to be injected into the battery case 1. The pre-charging was conducted with the non-aqueous electrolyte solution 5b being retained by the electrode body 12. The pre-charging was conducted for 30 minutes at room temperature and 0.4 C. After the pre-charging, a solution prepared by adding 1.5 mol/L of $LiPF_6$ as a supporting electrolyte salt, 1 wt % of VC as an additive agent, and ethoxy pentafluoro cyclophosphazene as a flame retardant to a solvent of EC:DEC:EMC=3:6:1 as the non-aqueous electrolyte solution 5a containing a flame retardant was injected into the battery case 1 such that the flame retardant concentration in the electrolyte solution 5 in the battery case 1 became 6 wt %. Thus, the battery B was produced.

In the battery B, it is considered that the flame retardant concentration in the non-aqueous electrolyte solution in the electrode body 12 is lower than the flame retardant concentration in the non-aqueous electrolyte solution between the electrode body 12 and the battery case 1. In addition, pre-charging was performed with the state in which the non-aqueous electrolyte solution substantially free of a flame retardant was brought into contact with the surface of the positive-electrode active material and the surface of the negative-electrode active material. Therefore, it is considered that a solid electrolyte interface film substantially free of a component derived from a flame retardant is formed on the surface of the positive-electrode active material or the negative-electrode active material.

In the battery C as a comparative example 1, the electrode body 12 already fixed with the shrink tube 15 was placed into the battery case 1, and this battery case 1 was sealed with the lid member 2. Then, a solution prepared by adding 1.5 mol/L of $LiPF_6$ as a supporting electrolyte salt, 1 wt % of VC as an additive agent, and ethoxy pentafluoro cyclophosphazene as a flame retardant to a solvent of EC:DEC:EMC=3:6:1 as the non-aqueous electrolyte solution 5a containing a flame retardant was injected into the battery case 1. Pre-charging was performed to produce the battery C. The pre-charging was conducted for 30 minutes at room temperature and 0.4 C.

In the battery C, it is considered that the flame retardant concentration in the non-aqueous electrolyte solution in the electrode body 12 is the same as the flame retardant concentration in the non-aqueous electrolyte solution between the electrode body 12 and the battery case 1. In addition, pre-charging was performed with the state in which the non-aqueous electrolyte solution 5a containing a flame retardant was brought into contact with the surface of the positive-electrode active material and the surface of the negative-electrode active material in the battery C. Therefore, it is considered that a solid electrolyte interface film containing a component derived from a flame retardant is formed on the surface of the positive-electrode active material or the negative-electrode active material.

In the battery D as a comparative example 2, the electrode body 12 already fixed with the shrink tube 15 was placed into the battery case 1, and this battery case 1 was sealed with the lid member 2. Then, a solution prepared by adding 1.5 mol/L of $LiPF_6$ as a supporting electrolyte salt and 1 wt % of VC as an additive agent to a solvent of EC:DEC:EMC=3:6:1 as the non-aqueous electrolyte solution 5b free of a flame retardant was injected into the battery case 1. Pre-charging was performed to produce the battery D. The pre-charging was conducted for 30 minutes at room temperature and 0.4 C.

In the battery D, neither the non-aqueous electrolyte solution in the electrode body 12 nor the non-aqueous electrolyte solution between the electrode body 12 and the battery case 1 contain a flame retardant. In addition, the pre-charging was performed to the battery D with the state in which the non-aqueous electrolyte solution free of a flame retardant was in contact with the surface of the positive-electrode active material and the surface of the negative-electrode active material. Therefore, it is considered that a solid electrolyte interface film substantially free of a component derived from a flame retardant is formed on the surface of the positive-electrode active material or the negative-electrode active material. However, the whole non-aqueous electrolyte solution 5 in the battery case 1 does not contain a flame retardant, so that a flash point of the non-aqueous electrolyte solution 5 is considered to be low.

A charging-discharging test was performed to the produced batteries A to D. In the test, the temperature of each battery was held at 50° C., and with this state, the battery was charged to 3.50 V with a current value of 1 CA. After reaching 3.50 V, the battery was held with this voltage for 90 minutes. Thereafter, about a ten-minute interval was formed, and then, the battery was discharged to 2.0 V with a current value of 1 CA. After the battery reached 2.0 V, about a ten-minute interval was formed, and then, the battery was again charged to 3.50 V with a constant current with a current value of 1 CA. 300 cycles of the charging-discharging test described above were performed for each of the batteries A to D, and the battery capacity was measured.

FIG. 14 illustrates the measurement result of the charging-discharging cycle test. In FIG. 14, the battery capacity is shown as a capacity retention rate (%) with the battery capacity in the first charging-discharging cycle being defined as 100%.

The measurement result of the battery C according to the comparative example 1 in FIG. 14 shows that the capacity retention rate was gradually reduced with the repeated charging-discharging cycles, and the battery capacity after 300 cycles was lower than the battery capacity in the first charging-discharging cycle by about 12.5%. It is considered that the reduction in the capacity retention rate was large because the solid electrolyte interface film containing a component derived from a flame retardant was formed on the surface of the positive-electrode active material or the negative-electrode active material in the battery C.

The measurement result of the battery D according to the comparative example 2 in FIG. 14 shows that the capacity retention rate was gradually reduced with the repeated charging-discharging cycles, and the battery capacity after 300 cycles was lower than the battery capacity in the first charging-discharging cycle by about 9%. It is considered that the reduction in the capacity retention rate was suppressed because the solid electrolyte interface film free of a component derived from a flame retardant was formed on the surface of the positive-electrode active material or the negative-electrode active material in the battery D. Notably, the non-aqueous electrolyte solution in the battery D does not contain a flame retardant.

The measurement result of the battery A according to the example 1 in FIG. 14 shows that the capacity retention rate was gradually reduced with the repeated charging-discharging cycles, and the battery capacity after 300 cycles was lower than the battery capacity in the first charging-discharging cycle by about 9%. It is considered that the reduction in the capacity retention rate was suppressed because the solid electrolyte interface film substantially free of a component derived from a flame retardant was formed on the surface of the positive-electrode active material or the negative-electrode active material by the pre-charging in the battery A. Although the non-aqueous electrolyte solution in the battery A contains a flame retardant, the battery A has cycle characteristics equal to the battery D.

The measurement result of the battery B according to the example 2 in FIG. 14 shows that the capacity retention rate was gradually reduced with the repeated charging-discharging cycles, and the battery capacity after 300 cycles was lower than the battery capacity in the first charging-discharging cycle by about 9.5%. It is considered that the reduction in the capacity retention rate was suppressed because the solid electrolyte interface film substantially free of a component derived from a flame retardant was formed on the surface of the positive-electrode active material or the negative-electrode active material by the pre-charging in the battery B. Although the non-aqueous electrolyte solution in the battery B contains a flame retardant, the battery B has cycle characteristics equal to the battery D.

The flash point of the non-aqueous electrolyte solution extracted from each of the batteries A to D before the charging-discharging cycle test and the flash point of the non-aqueous electrolyte solution extracted from each of the batteries A to D after the charging-discharging cycle test were measured. The flash point was measured with Cleveland open cup method.

The Cleveland open cup method is prescribed in JIS K 2265-4. With this method, a sample is heated under a prescribed condition, and a small flame is put close to the sample. The lowest sample temperature at which the small flame causes the generated vapor to ignite is measured. In this way, a flash point can be obtained.

Table 1 illustrates the measurement results.

In the measurement result of the battery C according to the comparative example 1 in Table 1, the flash point after the test was 72° C. which was lower than the flash point before the test by about 20° C. The conceivable reason is such that the flame retardant concentration in the non-aqueous electrolyte solution is reduced due to the consumption of the flame retardant in the non-aqueous electrolyte solution by the charging-discharging cycle.

In the measurement result of the battery D according to the comparative example 2 in Table 1, the flash point was 35° C. before and after the test. This is considered to be the same as the flash point of the non-aqueous electrolyte solution free of a flame retardant.

In the measurement result of the battery A according to the example 1 in Table 1, the flash point after the test was 96° C. which was higher than the flash point before the test by about 4° C. The conceivable reason is such that the consumption of the flame retardant due to electrochemical reaction in the electrode active materials is suppressed due to low flame retardant concentration in the electrode body 12, and the flame retardant concentration in the non-aqueous electrolyte solution is raised due to the consumption of the solvent contained in the non-aqueous electrolyte solution by the charging-discharging cycle. Another conceivable reason is such that the consumption of the flame retardant in the non-aqueous electrolyte solution is suppressed due to a high quality of the solid electrolyte interface film formed on the surface of the positive-electrode active material or the negative-electrode active material, and the flame retardant concentration in the non-aqueous electrolyte solution is raised due to the consumption of the solvent contained in the non-aqueous electrolyte solution by the charging-discharging cycle.

In the measurement result of the battery B according to the example 2 in Table 1, the flash point after the test was 95° C. which was higher than the flash point before the test by about 3° C. The conceivable reason is such that the consumption of the flame retardant due to electrochemical reaction in the electrode active materials is suppressed due to low flame retardant concentration in the electrode body 12, and the flame retardant concentration in the non-aqueous electrolyte solution is raised due to the consumption of the solvent contained in the non-aqueous electrolyte solution by the charging-discharging cycle. Another conceivable reason is such that the consumption of the flame retardant in the non-aqueous electrolyte solution is suppressed due to a high quality of the solid electrolyte interface film formed on the surface of the positive-electrode active material or the negative-electrode active material, and the flame retardant concentration in the non-aqueous electrolyte solution is raised due to the consumption of the solvent contained in the non-aqueous electrolyte solution by the charging-discharging cycle.

TABLE 1

|  | Battery A | Battery B | Battery C | Battery D |
|---|---|---|---|---|
| Flash point of electrolyte solution before test | 92° C. | 92° C. | 92° C. | 35° C. |
| Flash point of electrolyte solution after test | 96° C. | 95° C. | 72° C. | 35° C. |

EXPLANATION OF NUMERALS

1: Battery case
2: Lid member
3: Positive-electrode current collector
4: Negative-electrode current collector
5: Non-aqueous electrolyte (non-aqueous electrolyte solution)
5a: Non-aqueous electrolyte solution containing flame retardant
5b: Non-aqueous electrolyte solution free of flame retardant
6a, 6b: Screw member
7: Current collector
8a, 8b: External connection terminal
10a, 10b: External insulating member
11a, 11b: Internal insulating member
12: Electrode body
13a, 13b: Packing
15: Shrink tube
17: Outer casing
20: Non-aqueous electrolyte (lithium ion) secondary battery
21: Positive electrode
22: Negative electrode
23: Electrode connection portion
24: Separator
25: Positive-electrode active material layer
26: Negative-electrode active material layer
27: Positive-electrode current collector sheet
28: Negative-electrode current collector sheet
29: Active material uncoated portion
31: Projection portion
32: Graphite particles
33: Negative-electrode active material
35: Solid electrolyte interface film (SEI)
37: Pretreatment container

The invention claimed is:

1. A non-aqueous electrolyte secondary battery comprising:
    an electrode body having a structure in which a positive electrode including a positive-electrode active material and a negative electrode including a negative-electrode active material are stacked with a separator interposed therebetween;
    a positive-electrode current collector connected electrically with the positive electrode;
    a negative-electrode current collector connected electrically with the negative electrode;

a shrink tube made of a tube-shaped resin film;
a non-aqueous electrolyte solution containing a flame retardant; and
an outer casing accommodating the electrode body, the positive-electrode current collector, the negative-electrode current collector, the shrink tube, and the non-aqueous electrolyte solution, wherein
the positive electrode has a positive-electrode current collector sheet,
the negative electrode has a negative-electrode current collector sheet,
the positive-electrode current collector is connected with the positive-electrode current collector sheet,
the negative-electrode current collector is connected with the negative-electrode current collector sheet,
the shrink tube is provided so as to encompass the positive-electrode current collector, the negative-electrode current collector, and the electrode body by bundling the positive-electrode current collector, the negative-electrode current collector, and the electrode body together,
the electrode body is located between the positive-electrode current collector and the negative-electrode current collector,
the positive-electrode current collector is located at one side of the electrode body and the negative-electrode current collector is located at another side of the electrode body,
the shrink tube has openings both ends of the shrink tube,
the openings are located at the top and the bottom of the electrode body,
the shrink tube covers the entire area of the side faces of the electrode body,
the separator is a microporous film and covers a side edge of the positive electrode and a side edge of the negative electrode on opposite sides of the electrode body, and
the non-aqueous electrolyte solution in the electrode body has a flame retardant concentration lower than a flame retardant concentration in the non-aqueous electrolyte solution between the shrink tube and the outer casing.

2. The non-aqueous electrolyte secondary battery according to claim 1, wherein
the positive electrode comprises a porous positive-electrode active material layer including the positive-electrode active material,
the negative electrode comprises a porous negative-electrode active material layer including the negative-electrode active material, and
the non-aqueous electrolyte solution in the electrode body is the non-aqueous electrolyte solution in pores of the positive-electrode active material layer, or the non-aqueous electrolyte solution in pores of the negative-electrode active material layer.

3. The non-aqueous electrolyte secondary battery according to claim 1, wherein the non-aqueous electrolyte solution contains ethylene carbonate.

4. The non-aqueous electrolyte secondary battery according to claim 1, wherein the flame retardant is a phosphazene compound.

5. The non-aqueous electrolyte secondary battery according to claim 1, wherein the negative-electrode active material is made of a graphite material.

6. A method for producing a non-aqueous electrolyte secondary battery, comprising the steps of:
impregnating a porous negative-electrode active material layer and a porous positive-electrode active material layer with a non-aqueous electrolyte solution by dipping an electrode body, a positive-electrode current collector, a negative-electrode current collector, and a shrink tube made of a tube-shaped resin film into the non-aqueous electrolyte solution substantially free of a flame retardant, the electrode body having a structure in which a negative electrode including the porous negative-electrode active material layer and a positive electrode including the porous positive-electrode active material layer are stacked with a separator interposed therebetween, the positive-electrode current collector connecting electrically with the positive electrode, the negative-electrode current collector connecting electrically with the negative electrode, the shrink tube being provided so as to encompass the positive-electrode current collector, the negative-electrode current collector, and the electrode body by bundling the positive-electrode current collector, the negative-electrode current collector, and the electrode body together; and
placing a flame retardant and a non-aqueous electrolyte solution into an outer casing accommodating the positive electrode and the negative electrode wherein
the positive electrode has a positive-electrode current collector sheet,
the negative electrode has a negative-electrode current collector sheet,
the positive-electrode current collector is connected with the positive-electrode current collector sheet,
the negative-electrode current collector is connected with the negative-electrode current collector sheet,
the electrode body is located between the positive-electrode current collector and the negative-electrode current collector,
the positive-electrode current collector is located at one side of the electrode body and the negative-electrode current collector is located at another side of the electrode body,
the shrink tube has openings on both ends of the shrink tube,
the openings are located at the top and the bottom of the electrode body,
the shrink tube covers the entire area of side faces of the electrode body, and
the separator is a microporous film and covers a side edge of the positive electrode and a side edge of the negative electrode on opposite sides of the electrode body.

7. The method for producing the non-aqueous electrolyte secondary battery according to claim 6, further comprising a step of charging the electrode body by applying a voltage between the positive electrode and the negative electrode with the state in which the electrode body is dipped into the non-aqueous electrolyte solution substantially free of a flame retardant.

8. The method for producing the non-aqueous electrolyte secondary battery according to claim 6, wherein the step of impregnating is a step of impregnating the electrode body with the non-aqueous electrolyte solution in the outer casing.

9. The method for producing the non-aqueous electrolyte secondary battery according to claim 6, wherein the step of impregnating is a step of impregnating the electrode body with the non-aqueous electrolyte solution in a container different from the outer casing.

10. The non-aqueous electrolyte secondary battery according to claim 2, wherein the non-aqueous electrolyte solution contains ethylene carbonate.

11. The non-aqueous electrolyte secondary battery according to claim 2, wherein the flame retardant is a phosphazene compound.

12. The non-aqueous electrolyte secondary battery according to claim 10, wherein the flame retardant is a phosphazene compound.

13. The non-aqueous electrolyte secondary battery according to claim 3, wherein the flame retardant is a phosphazene compound.

\* \* \* \* \*